United States Patent
Kurokawa et al.

(10) Patent No.: US 9,772,702 B2
(45) Date of Patent: Sep. 26, 2017

(54) DRIVING METHOD OF DISPLAY DEVICE

(75) Inventors: Yoshiyuki Kurokawa, Kanagawa (JP); Takayuki Ikeda, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 1244 days.

(21) Appl. No.: 13/032,894

(22) Filed: Feb. 23, 2011

(65) Prior Publication Data

US 2011/0221723 A1  Sep. 15, 2011

(30) Foreign Application Priority Data

Mar. 12, 2010  (JP) ................. 2010-055878

(51) Int. Cl.
    *G06F 3/042*     (2006.01)
    *G06F 3/041*     (2006.01)
    *G09G 3/36*     (2006.01)

(52) U.S. Cl.
    CPC .......... *G06F 3/0412* (2013.01); *G06F 3/042* (2013.01); *G09G 3/3648* (2013.01); *G09G 2354/00* (2013.01)

(58) Field of Classification Search
    CPC ...................................................... G09G 5/00
    USPC ....................................................... 345/207
    See application file for complete search history.

(56) References Cited

U.S. PATENT DOCUMENTS

| | | | |
|---|---|---|---|
| 5,731,856 A | 3/1998 | Kim et al. | |
| 5,744,864 A | 4/1998 | Cillessen et al. | |
| 6,243,069 B1 | 6/2001 | Ogawa et al. | |
| 6,294,274 B1 | 9/2001 | Kawazoe et al. | |
| 6,563,174 B2 | 5/2003 | Kawasaki et al. | |
| 6,727,522 B1 | 4/2004 | Kawasaki et al. | |
| 6,747,638 B2 * | 6/2004 | Yamazaki et al. | 345/207 |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |

(Continued)

FOREIGN PATENT DOCUMENTS

| | | |
|---|---|---|
| CN | 001877406 A | 12/2006 |
| CN | 101527116 A | 9/2009 |

(Continued)

OTHER PUBLICATIONS

Chinese Office Action (Application No. 201180013656.1) Dated Mar. 17, 2015.

(Continued)

*Primary Examiner* — Nicholas Lee
(74) *Attorney, Agent, or Firm* — Nixon Peabody LLP; Jeffrey L. Costellia

(57) ABSTRACT

A display device has a pixel array including a plurality of pixels arranged in a matrix and a backlight provided to face a substrate over which the pixel array is formed, and display element portions photosensor portions are formed in the pixels. In the display device, in one frame period for displaying a black image which is interposed between two successive periods forming an image or a backlighting shutoff period in one frame period in which the display element portion holds an image, an accumulation operation of the photosensor portion is performed, the pixels are successively selected for each row, and a signal corresponding to the potential of a signal charge accumulation portion of the photosensor portion is output.

10 Claims, 29 Drawing Sheets

(56) References Cited

U.S. PATENT DOCUMENTS

| | | |
|---|---|---|
| 7,105,868 B2 | 9/2006 | Nause et al. |
| 7,211,825 B2 | 5/2007 | Shih et al |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,385,594 B2 | 6/2008 | Liao et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,525,523 B2 | 4/2009 | Yamazaki et al. |
| 7,612,320 B2 | 11/2009 | Hagihara |
| 7,652,704 B2 | 1/2010 | Mauritzson et al. |
| 7,674,650 B2 | 3/2010 | Akimoto et al. |
| 7,732,819 B2 | 6/2010 | Akimoto et al. |
| 7,804,479 B2 | 9/2010 | Furukawa et al. |
| 8,026,969 B2 | 9/2011 | Mauritzson et al. |
| 8,259,098 B2 | 9/2012 | Seto |
| 8,305,304 B2 | 11/2012 | Kimura |
| 8,411,117 B2 | 4/2013 | Fujioka et al. |
| 8,446,390 B2 | 5/2013 | Hattori |
| 8,791,929 B2 | 7/2014 | Kimura |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager, III et al. |
| 2004/0008172 A1* | 1/2004 | Nakamura et al. ............ 345/89 |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0262055 A1* | 11/2006 | Takahara ..................... 345/81 |
| 2006/0284171 A1 | 12/2006 | Levy et al. |
| 2006/0284172 A1 | 12/2006 | Ishii |
| 2006/0292777 A1 | 12/2006 | Dunbar |
| 2007/0018075 A1 | 1/2007 | Cazaux et al. |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0054319 A1 | 3/2008 | Mouli |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0180385 A1 | 7/2008 | Yoshida et al. |
| 2008/0182358 A1 | 7/2008 | Cowdery-Corvan et al. |
| 2008/0197269 A1* | 8/2008 | Hagihara ................ 250/208.1 |
| 2008/0211787 A1* | 9/2008 | Nakao et al. ................ 345/175 |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0027358 A1 | 1/2009 | Hosono |
| 2009/0068773 A1 | 3/2009 | Lai et al. |
| 2009/0072233 A1* | 3/2009 | Hayashi et al. ............... 257/43 |
| 2009/0073325 A1 | 3/2009 | Kuwabara et al. |
| 2009/0101948 A1 | 4/2009 | Park et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2009/0289968 A1 | 11/2009 | Yoshida |
| 2009/0295769 A1 | 12/2009 | Yamazaki et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2010/0165280 A1* | 7/2010 | Ishitani ............... G02F 1/13718 349/141 |
| 2010/0182282 A1 | 7/2010 | Kurokawa et al. |
| 2010/0283765 A1 | 11/2010 | Gotoh et al. |
| 2010/0289784 A1* | 11/2010 | Fujioka ............... G02F 1/13338 345/207 |
| 2011/0176038 A1 | 7/2011 | Kurokawa et al. |
| 2014/0327663 A1 | 11/2014 | Kimura |

FOREIGN PATENT DOCUMENTS

| | | |
|---|---|---|
| EP | 0915367 A | 5/1999 |
| EP | 1 737 044 A1 | 12/2006 |
| EP | 2221659 A | 8/2010 |
| EP | 2 226 847 A2 | 9/2010 |
| JP | 60-198861 | 10/1985 |
| JP | 63-210022 | 8/1988 |
| JP | 63-210023 | 8/1988 |
| JP | 63-210024 | 8/1988 |
| JP | 63-215519 | 9/1988 |
| JP | 63-239117 | 10/1988 |
| JP | 63-265818 | 11/1988 |
| JP | 05-251705 | 9/1993 |
| JP | 08-264794 | 10/1996 |
| JP | 11-006991 A | 1/1999 |
| JP | 11-505377 | 5/1999 |
| JP | 2000-044236 | 2/2000 |
| JP | 2000-150900 | 5/2000 |
| JP | 2001-194232 A | 7/2001 |
| JP | 2001-292276 | 10/2001 |
| JP | 2002-076356 | 3/2002 |
| JP | 2002-289859 | 10/2002 |
| JP | 2003-086000 | 3/2003 |
| JP | 2003-086808 | 3/2003 |
| JP | 2004-103957 | 4/2004 |
| JP | 2004-273614 | 9/2004 |
| JP | 2004-273732 | 9/2004 |
| JP | 2005-235174 A | 9/2005 |
| JP | 2006-317682 A | 11/2006 |
| JP | 2008-203561 | 9/2008 |
| JP | 2008-205891 | 9/2008 |
| JP | 2009-032005 A | 2/2009 |
| JP | 2009-282303 A | 12/2009 |

(56) References Cited

FOREIGN PATENT DOCUMENTS

| JP | 2010-040074 A | 2/2010 |
|---|---|---|
| JP | 2010-044299 A | 2/2010 |
| TW | 200622968 | 7/2006 |
| WO | WO-2004/114391 A1 | 12/2004 |
| WO | WO-2006/026163 | 3/2006 |
| WO | WO-2009/081810 | 7/2009 |
| WO | WO-2009/110293 | 9/2009 |

OTHER PUBLICATIONS

Taiwanese Office Action (Application No. 100107315) Dated Sep. 17, 2015.
Fortunato.E et al., "Wide-Bandgap High-Mobility ZnO Thin-Film Transistors Produced At Room Temperature.". Appl. Phys.Lett. ( Applied Physics Letters ) , Sep. 27, 2004, vol. 85, No. 13, pp. 2541-2543.
Dembo.H et al., "RFCPUS on glass and plastic substrates fabricated by TFT Transfer Technology,", IEDM 05: Technical Digest of International Electron Devices Meeting, Dec. 5, 2005, pp. 1067-1069.
Ikeda.T et al., "Full-Functional System Liquid Crystal Display Using CG-Silicon Technology,", SID Digest '04 : SID International Symposium Digest of Technical Papers, 2004, vol. 35, pp. 860-863.
Nomura.K et al., "Room-Temperature Fabrication of Transparent Flexible Thin-Film Transistors Using Amorphous Oxide Semiconductors,", Nature, Nov. 25, 2004, vol. 432, pp. 488-492.
Park.J et al., "Improvements in the Device Characteristics of Amorphous Indium Gallium Zinc Oxide Thin-Film Transistors by Ar Plasma Treatment,", Appl. Phys. Lett. ( Applied Physics Letters ) , Jun. 26, 2007, vol. 90, No. 26, pp. 262106-1-262106-3.
Takahashi.M et al., "Theoretical Analysis of IGZO Transparent Amorphous Oxide Semiconductor,", IDW '08 : Proceedings of the 15th International Display Workshops, Dec. 3, 2008, pp. 1637-1640.
Hayashi.R et al., "42.1: Invited Paper: Improved Amorphous In—Ga—Zn—O TFTs,", SID Digest '08 : SID International Symposium Digest of Technical Papers, May 20, 2008, vol. 39, pp. 621-624.
Prins.M et al., "A Ferroelectric Transparent Thin-Film Transistor,", Appl. Phys. Lett. ( Applied Physics Letters ) , Jun. 17, 1996, vol. 68, No. 25, pp. 3650-3652.
Nakamura.M et al., "The phase relations in the In2O3—Ga2ZnO4—ZnO system at 1350° C,", Journal of Solid State Chemistry, Aug. 1, 1991, vol. 93, No. 2, pp. 295-315.
Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System,", Journal of Solid State Chemistry, Apr. 1, 1995, vol. 116, No. 1, pp. 170-178.
Nomura.K et al., "Thin-Film Transistor Fabricated in Single-Crystalline Transparent Oxide Semiconductor,", Science, May 23, 2003, vol. 300, No. 5623, pp. 1269-1272.
Masuda.S et al., "Transparent thin film transistors using ZnO as an active channel layer and their electrical properties,", J.Appl. Phys. ( Journal of Applied Physics ) , Feb. 1, 2003, vol. 93, No. 3, pp. 1624-1630.
Asakuma.N et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.
Osada.T et al., "15.2: Development of Driver-Integrated Panel using Amorphous In—Ga—Zn-Oxide TFT,", SID Digest '09 : SID International Symposium Digest of Technical Papers, May 31, 2009, pp. 184-187.
Nomura.K et al., "Carrier transport in transparent oxide semiconductor with intrinsic structural randomness probed using single-crystalline InGaO3(ZnO)5 films,", Appl. Phys. Lett. ( Applied Physics Letters ) , Sep. 13, 2004, vol. 85, No. 11, pp. 1993-1995.

Li.C et al., "Modulated Structures of Homologous Compounds InMO3(ZnO)m (M=In,Ga; m=Integer) Described by Four-Dimensional Superspace Group,", Journal of Solid State Chemistry, 1998, vol. 139, pp. 347-355.
Son.K et al., "42.4L: Late-News Paper: 4 Inch QVGA AMOLED Driven by the Threshold Voltage Controlled Amorphous GIZO (Ga2O3—In2O3—ZnO) TFT,", SID Digest '08 : SID International Symposium Digest of Technical Papers, May 20, 2008, vol. 39, pp. 633-636.
Lee.J et al., "World's Largest (15-Inch) XGA AMLCD Panel Using IGZO Oxide TFT,", SID Digest '08 : SID International Symposium Digest of Technical Papers, May 20, 2008, vol. 39, pp. 625-628.
Nowatari.H et al., "60.2: Intermediate Connector With Suppressed Voltage Loss for White Tandem OLEDS,", SID Digest '09 : SID International Symposium Digest of Technical Papers, May 31, 2009, vol. 40, pp. 899-902.
Kanno.H et al., "White Stacked Electrophosphorecent Organic Light-Emitting Devices Employing MOO3 As A Charge-Generation Layer,", Adv. Mater. (Advanced Materials), 2006, vol. 18, No. 3, pp. 339-342.
Tsuda.K et al., "Ultra Low Power Consumption Technologies for Mobile TFT-LCDs ,", IDW '02 : Proceedings of the 9th International Display Workshops, Dec. 4, 2002, pp. 295-298.
Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.
Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.
Jeong.J et al., "3.1: Distinguished Paper: 12.1-Inch WXGA AMOLED Display Driven by Indium-Gallium-Zinc Oxide TFTs Array,", SID Digest '08 : SID International Symposium Digest of Technical Papers, May 20, 2008, vol. 39, No. 1, pp. 1-4.
Park.J et al., "High performance amorphous oxide thin film transistors with self-aligned top-gate structure,", IEDM 09: Technical Digest of International Electron Devices Meeting, Dec. 7, 2009, pp. 191-194.
Kurokawa.Y et al., "UHF RFCPUS on Flexible and Glass Substrates for Secure RFID Systems,", Journal of Solid-State Circuits , 2008, vol. 43, No. 1, pp. 292-299.
Ohara.H et al., "Amorphous In—Ga—Zn-Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.
Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.
Cho.D et al., "21.2:Al and Sn-Doped Zinc Indium Oxide Thin Film Transistors for AMOLED Back-Plane,", SID Digest '09 : SID International Symposium Digest of Technical Papers, May 31, 2009, pp. 280-283.
Lee.M et al., "15.4:Excellent Performance of Indium-Oxide-Based Thin-Film Transistors by DC Sputtering,", SID Digest '09 : SID International Symposium Digest of Technical Papers, May 31, 2009, pp. 191-193.
Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.
Sakata.J et al., "Development of 4.0-In. AMOLED Display With Driver Circuit Using Amorphous In—Ga—Zn-Oxide TFTs,", IDW '09 : Proceedings of the 16th International Display Workshops, 2009, pp. 689-692.
Park.J et al., "Amorphous Indium-Gallium-Zinc Oxide TFTs and Their Application for Large Size AMOLED,", AM-FPD '08 Digest of Technical Papers, Jul. 2, 2008, pp. 275-278.
Park.S et al., "Challenge to Future Displays: Transparent AM-OLED Driven by Peald Grown ZnO TFT,", IMID '07 Digest, 2007, pp. 1249-1252.
Godo.H et al., "Temperature Dependence of Characteristics and Electronic Structure for Amorphous In—Ga—Zn-Oxide TFT,", AM-FPD '09 Digest of Technical Papers, Jul. 1, 2009, pp. 41-44.

(56) References Cited

OTHER PUBLICATIONS

Osada.T et al., "Development of Driver-Integrated Panel Using Amorphous In—Ga—Zn-Oxide TFT,", AM-FPD '09 Digest of Technical Papers, Jul. 1, 2009, pp. 33-36.

Hirao.T et al., "Novel Top-Gate Zinc Oxide Thin-Film Transistors (ZnO TFTs) for AMLCDs,", Journal of the SID, 2007, vol. 15, No. 1, pp. 17-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn-Oxide TFT,", SID Digest '09 : SID International Symposium Digest of Technical Papers, May 31, 2009, pp. 1110-1112.

Ohara.H et al., "21.3:4.0 In. QVGA AMOLED Display Using In—Ga—Zn-Oxide TFTs With a Novel Passivation Layer,", SID Digest '09 : SID International Symposium Digest of Technical Papers, May 31, 2009, pp. 284-287.

Miyasaka.M, "SUFTLA Flexible Microelectronics on Their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

Asaoka.Y et al., "29.1:Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of , Challenges to, and Perspective View of AM-OLED,", IDW '06 Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, Vol. 1, pp. 64-68.

Kimizuka,N. et al., "SPINEL, $YbFe_2O_4$, and $Yb_2Fe_3O_7$ Types of Structures for Compounds in the $In_2O_3$ and $Sc_2O_3$—$A_2O_3$—BO Systems [A; Fe, Ga, or Al; B: Mg, Mn, Fe, Ni, Cu,or Zn] at Temperatures Over 1000° C,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent $InGaZnO_4$,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. ( Japanese Journal of Applied Physics ) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium-Gallium-Zinc Oxide Semiconductor Upon Exposure to Water,", Appl. Phys. Lett. ( Applied Physics Letters ) , 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. ( Applied Physics Letters ) , 2005, vol. 87, pp. 122102-1-122102-3.

Oba.F et al., "Defect energetics in ZnO: A hybrid Hartree-Fock density functional study,", Phys. Rev. B (Physical Review. B), 2008, vol. 77, pp. 245202-1-245202-6.

Orita.M et al., "Amorphous transparent conductive oxide $InGaO_3(ZnO)_m$ (m < 4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on $SrTiO_3$ With Sputtered $Al_2O_3$ Gate Insulator,", Appl.Phys. Lett. ( Applied Physics Letters ) , Sep. 1, 2003, vol. 83, No. 9, pp. 1755-1757.

Jeon, et al., "180nm Gate Length Amorphous InGaZnO Thin Film Transistor for High Density Image Sensor Applications", 2010, IEEE, pp. IEDM 10-504-10-507.

"International Search Report (Application No. PCT/JP2011/053877; PCT13297) Dated May 31, 2011,".

"Written Opinion (Application No. PCT/JP2011/053877; PCT13297) Dated May 31, 2011,".

* cited by examiner

DRIVING METHOD OF DISPLAY DEVICE

TECHNICAL FIELD

An embodiment of the present invention relates to a display device in which pixels each having a photosensor are arranged in a matrix and to a driving method of the display device. Further, an embodiment of the present invention relates to an electronic device including the display device.

BACKGROUND ART

In recent years, a display device provided with a light-detecting sensor (also referred to as a photosensor) has attracted attention. A display device having a photosensor in a display region, which can detect a touch of an object to be detected (e.g., a pen and a finger) on the display region, is called a touch panel, a touch screen, or the like (hereinafter simply called a "touch panel"). Such a photosensor provided in the display region enables the display region to double as an input region; as an example, a semiconductor device having an image loading function has been disclosed in Patent Document 1.

REFERENCE

Patent Document 1: Japanese Published Patent Application No. 2001-292276

DISCLOSURE OF INVENTION

A display device including such a photosensor perceives shadow of a fingertip or a pen point which is close to a display region functions as a touch panel. However, in the case where the display device includes a backlight, light delivered from the backlight reflects off the fingertip or the pen point, and the photosensor sometimes detects the reflect light.

In the case of external light with high illuminance, it is easy for the photosensor to perceive shadow of a fingertip, a pen point, or the like. However, in the case of external light with low illuminance, a difference between intensities of light which is emitted from a backlight and is reflected and external light is not sufficient and the photosensor cannot perceive shadow of a fingertip, a pen point, or the like, which causes a problem in insufficiency of performance of a display device as a touch panel.

Therefore, an embodiment of the present invention disclosed in this specification is a display device which can solve the above problem or a driving method of the display device.

An embodiment of the present invention disclosed in this specification relates to a display device which perceives shadow of an object to be detected with a photosensor included in a display region when a backlight is off.

An embodiment of the present invention disclosed in this specification is a display device having a pixel array including a plurality of pixels provided in a matrix, display element portions included in the pixels, photosensor portions included in the pixels, and a backlight provided to face a substrate over which the pixel array is formed. In the display device, the photosensor portion accumurates charge with all of the pixels within a period in which the backlight is turned off.

A charge accumulation operation of the photosensor portion is performed in a period of backlighting shutoff, and is not performed in other period. Accordingly, a photosensor does not detect light which is emitted from a backlight and is reflected, so that shadow of an object to be detected generated by external light can be perceived accurately. Here, a backlighting shutoff period is part of one frame period in which a display element portion holds an image.

An embodiment of the present invention disclosed in this specification is a display device having a pixel array including a plurality of pixels provided in a matrix, display element portions included in the pixels, and photosensor portions included in the pixels. In the display device, the photosensor portion accumulates charge with the use of all of the pixels within a period in which the display element portion displays a black image.

Here, display of a black image and display of a main image are alternately performed. Note that "a main image" is an image which is intentionally displayed by a user of the display device; for example, an image of a television program and an image written in a recording medium are given.

An embodiment of the present invention disclosed in this specification is a driving method of a display device which has a pixel array including a plurality of pixels provided in a matrix, display element portions included in the pixels, photosensor portions included in the pixels, and a backlight provided to face a substrate over which the pixel array is formed. The display device performs the following operation: turning on the backlight, displaying an image on the display element portion, turning off the backlight, resetting a potential of a signal charge accumulation portion of the photosensor portion, accumulating charge to the signal charge accumulation portion of the photosensor portion, holding charge of the signal charge accumulation portion of the photosensor portion, turning on the backlight, and outputting a signal corresponding to a potential of the signal charge accumulation portion of the photosensor portion after a pixel is successively selected for each row.

Here, operation from turning off the backlight to outputting a signal is performed within one frame period in which the display element holds an image, whereby an accumulation operation of the photosensor can be performed in all of the frame periods.

An embodiment of the present invention disclosed in this specification is a driving method of a display device which has a pixel array including a plurality of pixels provided in a matrix, display element portions included in the pixels, and photosensor portions included in the pixels. The display device performs operation of displaying an image on the display element portion and displaying a black image on the display element portion. In a period in which the black image is displayed on the display element portion, the display device performs the following operation: resetting a potential of a signal charge accumulation portion of the photosensor portion, accumulating charge to the signal charge accumulation portion of the photosensor portion, holding charge of the signal charge accumulation portion of the photosensor portion, and outputting a signal corresponding to a potential of the signal charge accumulation portion of the photosensor portion after a pixel is successively selected for each row.

Here, display of a main image and display of a black image on the display element portion are alternately performed. In addition, a black image is displayed or a backlight is off for one frame period or less, so that the display device can have an effect of reducing in residual images of a moving image.

With an embodiment of the present invention, a photosensor portion detects little light which is emitted from a backlight and is reflected off an object to be detected, so that a photosensor can accurately perceive a shadow generated by external light. Therefore, a touch panel with high resolution can be provided.

BEST MODE FOR CARRYING OUT THE INVENTION

Figure 1:
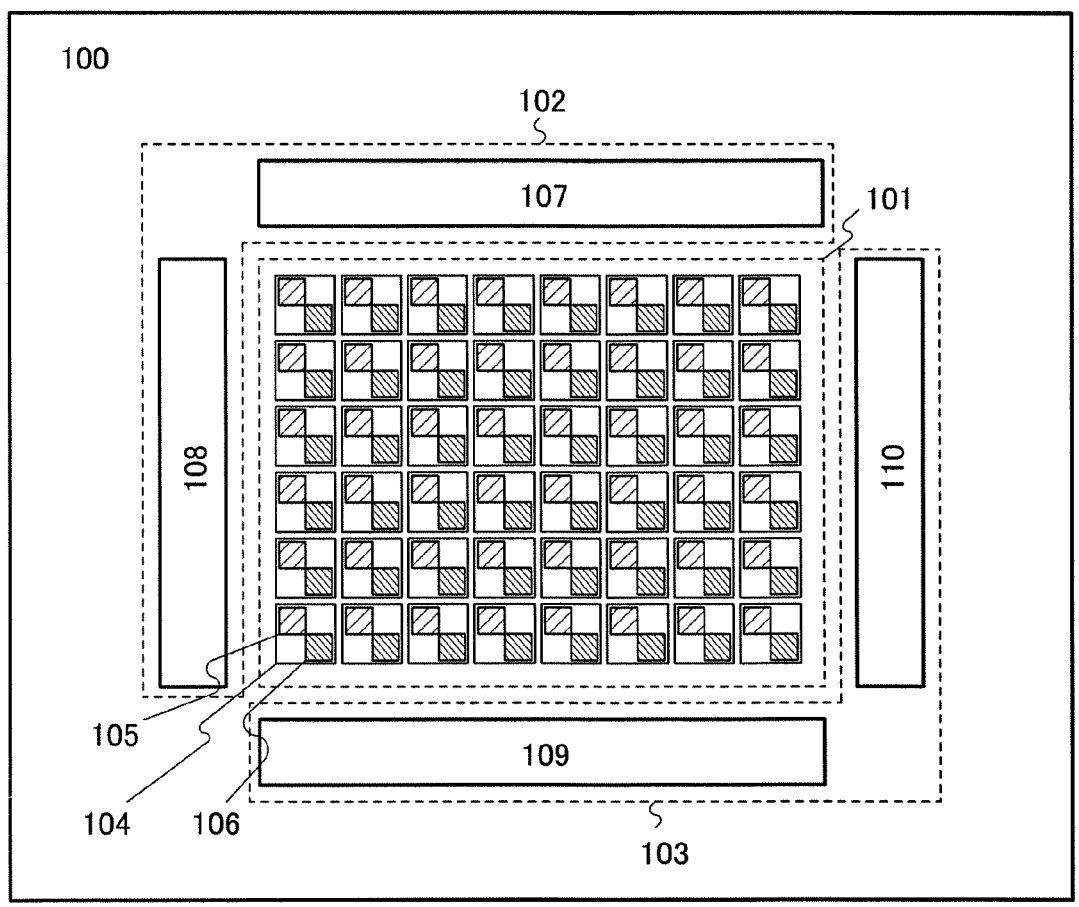
FIG. 1 illustrates a structure of a display device where a display region is provided with both a display element and a photosensor.

Hereinafter, embodiments of the present invention are described in detail with reference to the accompanying drawings. However, the present invention is not limited to the description below, and it is easily understood by those skilled in the art that modes and details disclosed herein can be modified in various ways without departing from the spirit and the scope of the present invention. Therefore, the present invention is not construed as being limited to description of the embodiments. Note that in the drawings for explaining the embodiments, the same parts or parts having a similar function are denoted by the same reference numerals, and description of such parts is not repeated.

Embodiment 1

In this embodiment, a transmissive liquid crystal display device with a backlight which is an embodiment of the present invention is described with reference to drawings. FIG. 1 illustrates an example of a structure of the transmissive liquid crystal display device.

A display device 100 includes a pixel array 101, a display element control circuit 102, and a photosensor control circuit 103. The pixel array 101 includes a plurality of pixels 104 arranged in a matrix. Each pixel 104 includes a display element portion 105, and a photosensor portion 106, for example.

The photosensor portion 106 is provided for imaging but it is not necessary to provide the photosensor portion for all the pixels. The photosensor portions may be formed in accordance with a purpose.

The display element control circuit 102 illustrated in FIG. 1 is a circuit for controlling the display element portions 105 and includes a display element driver circuit 107 which inputs a signal to the display element portions 105 through source signal lines (such as video-data signal lines) and a display element driver circuit 108 which inputs a signal to the display element portions 105 through gate signal lines (scan lines).

For example, the display element driver circuit 108 connected to the scanning line has a function of selecting the display element included in the pixel placed in a particular row. In addition, the display element driver circuit 107 connected to the signal line has a function of applying a predetermined potential to the display element included in the pixel placed in a selected row. Note that in the display element portion where a high potential is applied to the gate signal line from the display element driver circuit 108, a transistor is turned on and a potential applied to the source signal line from the display element driver circuit 107 is supplied to the display element portion.

The photosensor control circuit 103 is a circuit for controlling the photosensor portion 106 and includes a photosensor reading circuit 109 of signal lines such as a photosensor output signal line (hereinafter referred to as an output signal line), a photosensor reference signal line (hereinafter referred to as a reference signal line), and the like, and a photosensor driver circuit 110 of scanning lines such as a reset signal line, a gate signal line for row selection (hereinafter referred to as a selection signal line), and the like.

The photosensor driver circuit 110 has a function of performing a reset operation, an accumulation operation, and a selection operation, which are described later, on the photosensor portion 106 included in each of the pixels in a particular row. Further, the photosensor reading circuit 109 has a function of extracting output signals of the photosensor portions included in the selected pixels in the row. Note that the photosensor reading circuit 109 can have a system in which an output, which is an analog signal, of the photosensor portions is extracted as an analog signal to the outside by an OP amplifier; or a system in which the output is converted into a digital signal by an A/D converter circuit and then extracted to the outside.

A circuit diagram of the pixel 104 is described with reference to FIG. 2. Note that transistors and wirings in this embodiment are named for convenience. Any of names is acceptable as long as functions of the transistors and the wirings are described.

First, the display element portion 105 is described.

A gate of a transistor 201 is electrically connected to a gate signal line 215, one of a source and a drain of the transistor 201 is electrically connected to a source signal line 216, and the other of the source and the drain of the transistor 201 is electrically connected to one of electrodes of a storage capacitor 202 and one of electrodes of a liquid crystal element 203. The other electrode of the storage capacitor 202 and the other electrode of the liquid crystal element 203 are each held at a predetermined potential. The liquid crystal element 203 is an element including a liquid crystal layer provided between a pair of the electrodes.

The transistor 201 has a function of controlling injection or discharge of charge to/from the storage capacitor 202. For example, when a high potential is applied to the gate signal line 215, the potential of the source signal line 216 is applied to the storage capacitor 202 and the liquid crystal element 203. The storage capacitor 202 has a function of retaining charge corresponding to a voltage applied to the liquid crystal element 203.

Image display is realized in such a manner that the contrast (grayscale) of light passing through the liquid crystal element 203 is made by utilizing a phenomenon in which the polarization direction is changed by applying voltage to the liquid crystal element 203.

Although a semiconductor layer of amorphous silicon, microcrystalline silicon, polycrystalline silicon, or the like can also be used, it is preferable that an oxide semiconductor be used for the transistor 201. In a transistor including an oxide semiconductor, extremely low off-state current characteristics are shown; thus, a function of holding charge can be improved.

Next, the photosensor portion 106 is described.

A photodiode 204 generates current in accordance with the amount of light incident on the pixel. An amplifying transistor 207 outputs a signal which corresponds to the potential of a signal charge accumulation portion 210 (FD). A charge accumulation control transistor 205 controls charge accumulation in the signal charge accumulation portion 210 performed by the photodiode 204. A reset transistor 206 controls the initialization of the potential of the signal charge accumulation portion 210. A selection transistor 208 controls the selection of the pixel in reading. The signal charge accumulation portion 210 is a charge holding node, and holds charge which varies depending on the amount of light received by the photodiode 204.

A charge accumulation control signal line 213 is a signal line which controls the charge accumulation control transistor 205. A reset signal line 214 is a signal line which controls the reset transistor 206. A selection signal line 209 is a signal line which controls the selection transistor 208. An output signal line 211 is a signal line to serve as an output destination of a signal generated by the amplifying transistor 207. A power supply line 230 is a signal line which supplies power supply voltage. A reference signal line 212 is a signal line which sets a reference potential.

A gate of the charge accumulation control transistors 205 is connected to the charge accumulation control signal line 213, one of a source and a drain of the charge accumulation control transistors 205 is connected to a cathode of the photodiode 204, and the other of the source and the drain is connected to the signal charge accumulation portion 210. In addition, an anode of the photodiode 204 is connected to the reference signal line 212. Here, a charge holding capacitor may be connected to between the signal charge accumulation portion 210 and the reference signal line 212.

Note that a substantial signal charge accumulation portion is the capacitance of a depletion layer in the vicinity of a source region or drain region of a transistor, the gate capacitance of an amplifying transistor, or the like; however, the signal charge accumulation portion is conveniently described as part of a circuit diagram in this specification. Therefore, description of arrangement should follow the circuit diagram.

A gate of the amplifying transistor 207 is connected to the signal charge accumulation portion 210, one of a source and a drain of the amplifying transistor 207 is connected to the power supply line 230, and the other of the source and the drain of the amplifying transistor 207 is connected to one of a source and a drain of the selection transistor 208.

A gate of the reset transistor 206 is connected to the reset signal line 214, one of a source and a drain of the reset transistor 206 is connected to the power supply line 230, and the other of the source and drain of the reset transistor 206 is connected to the signal charge accumulation portion 210.

A gate of the selection transistor 208 is connected to the selection signal line 209 and the other of the source and the drain of the selection transistor 208 is connected to the output signal line 211.

Next, a structure of each element of the photosensor portion 106 is described.

The photodiode 204 can be formed using a silicon semiconductor with a PN junction or a PIN junction. Here, a PIN photodiode in which an i-type semiconductor layer is formed using amorphous silicon is used. Because amorphous silicon has optical absorption properties in a visible light wavelength region, an infrared ray cut filter does not have to be provided and the like; therefore, the amorphous silicon can be formed at low cost. In contrast, because crystalline silicon has optical absorption properties in an infrared wavelength region in addition to the visible light wavelength region, when an i-type semiconductor layer of a PIN photodiode is formed using crystalline silicon and combined with an infrared ray transmission filter, only infrared rays can be detected.

Although the charge accumulation control transistor 205, the reset transistor 206, the amplifying transistor 207, and the selection transistor 208 can also be formed using silicon semiconductor, these are preferably formed using an oxide semiconductor. A transistor including an oxide semiconductor has very low off-state current.

In particular, if the charge accumulation control transistor 205 and the reset transistor 206 which are connected to the signal charge accumulation portion 210 have large leakage current, the time when charge can be held in the signal charge accumulation portion 210 is not sufficient; therefore, at least the transistors are preferably be formed using an oxide semiconductor. When a transistor including an oxide semiconductor is used for the transistors, unwanted leakage of charge through the transistor can be prevented.

For the oxide semiconductor, a thin film represented by the chemical formula, $InMO_3(ZnO)_m$ (m>0) can be used. Here, M represents one or more metal elements selected from Zn, Ga, Al, Mn, and Co. For example, M can be Ga, Ga and Al, Ga and Mn, Ga and Co, or the like. Because a transistor is formed using an oxide semiconductor, the off-state current can be drastically reduced.

Next, a precharge circuit included in the photosensor reading circuit 109 is described. In FIG. 2, a precharge circuit 300 for one column of pixels includes a transistor 301, a storage capacitor 302, and a precharge signal line 303. Here, a p-channel transistor is used as the transistor 301. Note that an OP amplifier or an A/D converter circuit can be connected to a subsequent stage of the precharge circuit 300.

In the precharge circuit 300, before the operation of the photosensor portion in the pixel, the potential of the output signal line 211 is set at a reference potential. In the configuration of FIG. 2, the potential of the precharge signal line 303 is set to a low level so that the transistor 301 is turned on, whereby the potential of the output signal line 211 can be set at a reference potential (here, a high potential). The storage capacitor 302 is provided for the output signal line 211 so that the potential of the output signal line 211 is stabilized. Note that the storage capacitor 302 is not necessarily provided if the output signal line 211 has large parasitic capacitance. Note that the reference potential may be set at a low potential. In that case, the potential of the precharge signal line 303 is set to a high level with the use of an n-channel transistor as the transistor 301, whereby the potential of the output signal line 211 can be set at a low potential.

Next, read operations of the photosensor provided for the display device in this embodiment is described with reference to timing charts of FIGS. 3A and 3B.

Figure 3A:
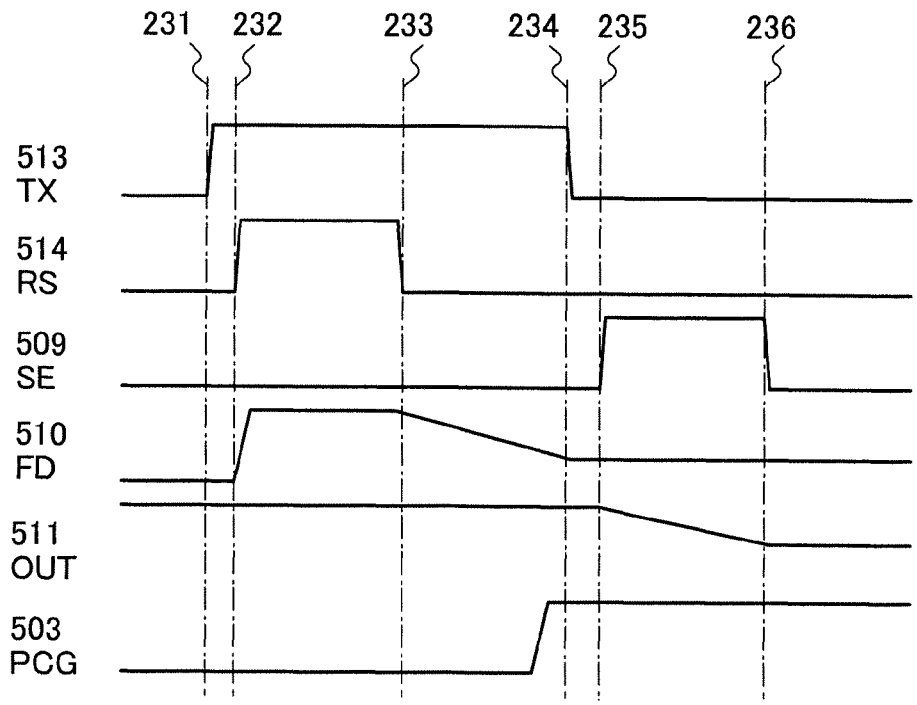
FIGS. 3A and 3B are timing charts of the operations of a photo sensor.
Figure 3B:
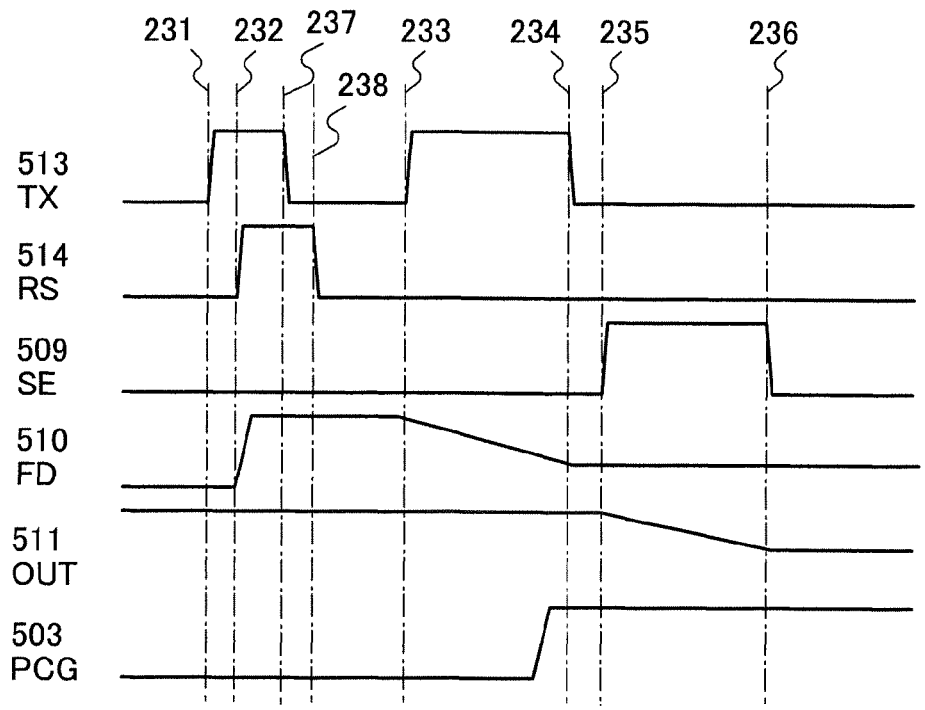

In FIGS. 3A and 3B, a potential 513 of the charge accumulation control signal line 213, a potential 514 of the reset signal line 214, a potential 509 of the selection signal line 209, a potential 510 of the signal charge accumulation portion 210, a potential 511 of the output signal line 211, and a potential 503 of the precharge signal line 303 are shown in this order from the top.

First, an operation mode according to FIG. 3A is described.

When the potential 513 of the charge accumulation control signal line 213 is set to a high level at time 231, and then the potential 514 of the reset signal line 214 is set to a high level at time 232, the potential 510 of the signal charge accumulation portion 210 is initialized to the potential of the power supply line 230 to be a reset potential. The above is the start of the reset operation.

When the potential 503 of the precharge signal line 303 is set to a low level, the potential 511 of the output signal line 211 is precharged to a high level.

The potential 514 of the reset signal line 214 is set to a low level at time 233, and the reset operation is terminated. At this time, the potential 510 of the signal charge accumulation portion 210 is held, and a reverse bias voltage is applied to the photodiode 204. This stage becomes the start of the accumulation operation. Then, reverse current corresponding to the amount of light flows to the photodiode 204, and the potential 510 of the signal charge accumulation portion 210 varies.

Then, the potential 503 of the precharge signal line 303 is set to a high level, and the output signal line 211 is finished being precharged. The precharge can be finished at any timing as long as before the selection transistor 208 is turned on.

When the potential 513 of the charge accumulation control signal line 213 is set to a low level at time 234, a transfer of charge from the signal charge accumulation portion 210 to the photodiode 204 stops, and the accumulation operation is terminated. Further, the potential 510 of the signal charge accumulation portion 210 is held at a certain value.

When the potential 509 of the selection signal line 209 is set to a high level at time 235, the selection operation starts and the potential 511 of the output signal line 211 changes in accordance with the potential 510 of the signal charge accumulation portion.

When the potential 509 of the selection signal line 209 is set to a low level at time 236, the potential 511 of the output signal line 211 has a certain value. At this stage, the selection operation and a read operation are terminated. After that, an operation at the time 231 are performed and the same operations are repeated, so that a taken-out image can be formed.

Next, an operation mode according to FIG. 3B is described.

When the potential 513 of the charge accumulation control signal line 213 is set to a high level at the time 231 and the potential 514 of the reset signal line 214 is set to a high level at the time 232, the potential 510 of the signal charge accumulation portion 210 and the potential of the cathode of the photodiode 204 are initialized to the potential of the power supply line 230 to be the reset potential. The above is the start of the reset operation.

When the potential 503 of the precharge signal line 303 is set to a low level, the potential 511 of the output signal line 211 is precharged to a high level.

When the potential 513 of the charge accumulation control signal line 213 is set to a low level at time 237 and the potential 514 of the reset signal line 214 is set to a low level at time 238, the reset operation is terminated; accordingly, reverse current corresponding to the amount of light flows to the photodiode 204 to which the reverse bias is applied, whereby the potential of the cathode of the photodiode 204 varies.

When the potential 513 of the charge accumulation control signal line 213 is set to a high level again at the time 233, current flows by a potential difference between the potential 510 of the signal charge accumulation portion 210 and the cathode of the photodiode 204, and the potential 510 of the signal charge accumulation portion 210 varies.

The steps after that are the same as those of the operation mode according to FIG. 3A.

The reset operation, the accumulation operation, and the selection operation are repeated per row of a pixel matrix in sequence and an output from each pixel is read, whereby an object to be detected which is touched or is close to the display panel can be imaged.

The above series of operations are an example in the case where the cathode of the photodiode 204 is connected to one of the source and the drain of the charge accumulation control transistor 205. Such an operation of generating an output signal can also be performed with the case where the anode of the photodiode 204 is connected to one of the source and the drain of the charge accumulation control transistor 205.

According to the above series of operations, the potential 510 of the signal charge accumulation portion 210 is initialized to a high level and discharged by reverse current generated by light with which the photodiode 204 is irradiated, and an output signal is determined through the amplifying transistor 207.

On the other hand, in the case where the photodiode 204 is reversely connected, the potential 510 of the signal charge accumulation portion 210 is initialized to a low level and charged with reverse current generated by delivering light to the photodiode 204, so that an output signal is determined through the amplifying transistor 207.

As a system of the accumulation operation and a read operation in all the pixels, the following two systems are known: a rolling shutter system and a global shutter system. In one embodiment of the present invention, the rolling shutter system can also be adopted; however, the global shutter system is preferably used.

With the global shutter system, an image can be taken out without a distortion even when an object moves at high speed especially, because the accumulation operation can be performed in all pixels substantially at the same time. The object moves also in the case of a touch panel, and it is appropriate that the global shutter system be used in order to obtain accurate location information in a display region.

A display device including a photosensor which is described in this embodiment has a CMOS sensor type system in which pixel signals are sequentially read out for each row. Therefore, when the global shutter system is used, periods from termination of the accumulation operation to start of the selection operation are different depending on pixels. In addition, when a charge holding period becomes longer, a signal deteriorates due to leakage of charge and an image cannot be normally taken out in some cases.

However, in an embodiment of the present invention, a transistor including an oxide semiconductor is used for a transistor connected to the signal charge accumulation portion for accumulation of charge, so that leakage of charge can be suppressed as much as possible. As described above, a transistor including an oxide semiconductor shows an extremely low off-state current; accordingly, the unwanted leakage of current can be prevented regardless of the amount of light delivered to a photodiode. Therefore, the global shutter system can be easily driven.

A display device in an embodiment of the present invention is a transmissive liquid crystal display device with backlight. Thus, a photosensor detects light which is emitted from a backlight and is reflected off an object to be detected and sometimes does not perceive a shadow of the object.

In order to solve the problem, backlight is shut off and the accumulation operation of the photosensor is performed during a shutoff period in an embodiment of the present invention. With the driving method, the photosensor does not detect light which is emitted from a backlight and is reflected off the object, so that misperception of a touch panel can be prevented.

Here, it is preferable that a period of backlighting shutoff be extremely short in order not to degrade performance of the display device. Backlighting shutoff is performed in part of one frame period for which a display element portion holds an image. In order to perform the accumulation operation of a photosensor within the extremely short time, the above global shutter system is more preferable. Note that the rolling shutter system can be also used, but an image is necessarily taken out at high speed in order that a backlighting shutoff period may not be long.

Further, the backlighting shutoff can provide the effect of improving the display characteristics of the display device.

A liquid crystal display device has a problem in that residual image occurs in displaying a moving image. As a method of improving moving image characteristics of the liquid crystal display device, a driving technique called black frame insertion is known in which black is displayed on the whole screen every other frame period or in part of one frame period.

A driving method of a liquid crystal element is a hold type and the same image is held for one frame period. Therefore, human eyes keep seeing the same image until the just moment before the next frame comes, thereby perceiving residual images. One method for removing the residual images is a black frame insertion technique in which a black image is inserted to remove the residual images.

One specific method of black frame insertion is backlighting shutoff. Therefore, in an embodiment of the present invention, misperception of the touch panel is prevented, and moving image display characteristics can be improved.

By a method of displaying a black image for one frame period, the accumulation operation of the photosensor may be performed during the period. In this case, backlighting shutoff is not necessary. Because little backlight passes through a liquid crystal element in displaying a black image, light which is emitted from a backlight and is reflected off an object is not generated in the frame period. Accordingly, misperception of a touch panel can be prevented by performing the accumulation operation of the photosensor within a frame period in which a black image is displayed. Note that a black image and a main image are alternately displayed, whereby an effect of black frame insertion can be obtained as described above; accordingly, moving image display characteristics can be improved.

Figure 4:
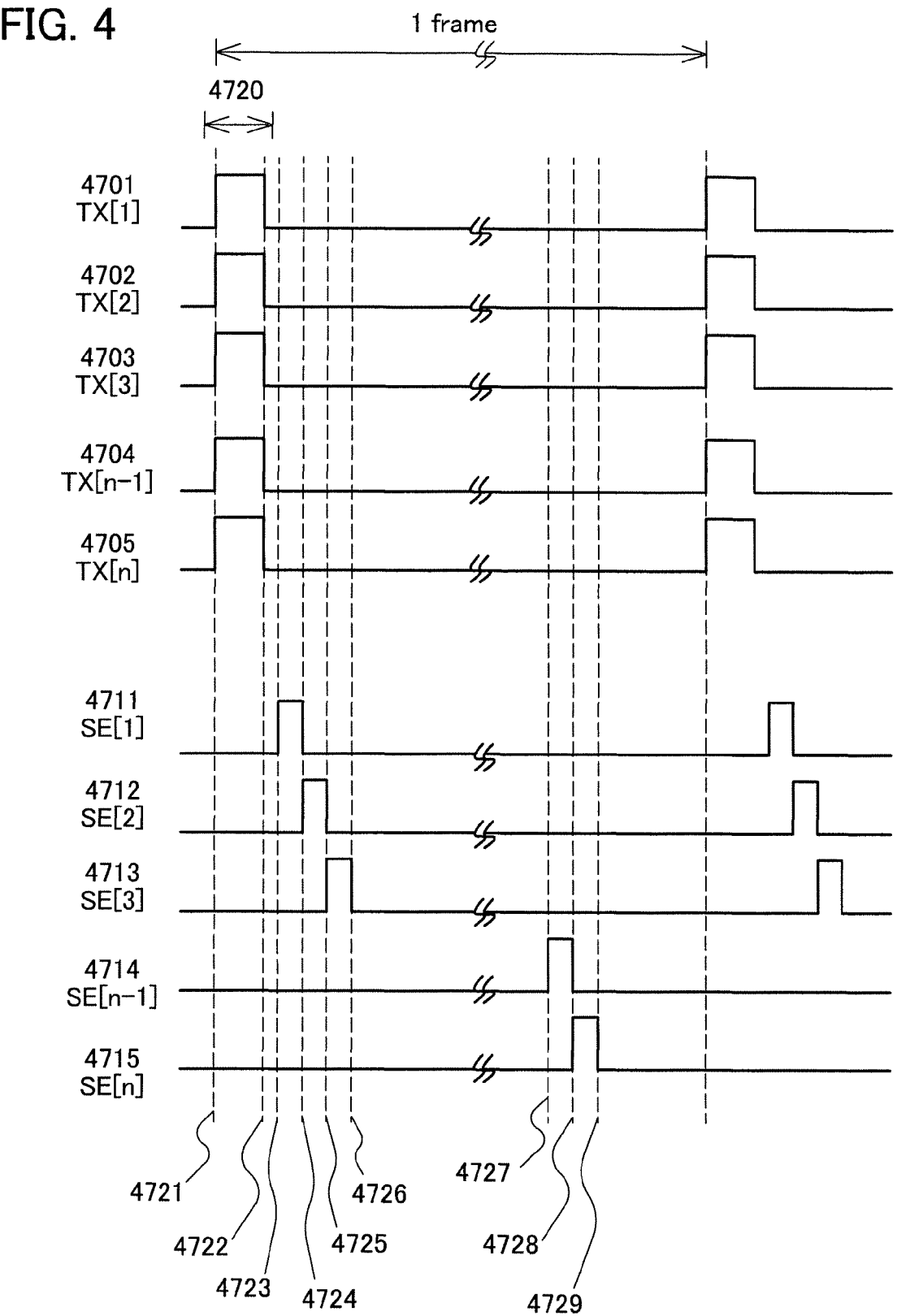
FIG. 4 is a timing chart of the operations of a photo sensor.

Next, an imaging operation of the display device including the photosensor portion 106 in FIG. 2, which includes a backlighting shutoff operation, is described with reference to a timing chart of FIG. 4. Note that the imaging operation drives the global shutter system but can drive the rolling shutter system.

First, a backlight is turned off at time 4721 or before the time 4721.

When potentials 4701 to 4705 of all of lines from a first charge accumulation control signal line to an n-th charge accumulation control signal line are concurrently set to a high level, the accumulation operation of pixels in the first row to the n-th row starts.

When the potentials 4701 to 4705 of all of lines from the first charge accumulation control signal line to the n-th charge accumulation control signal line are concurrently set to a low level at time 4722, the accumulation operation of pixels in the first row to the n-th row completed.

Then, the backlight is turned on. Here, a period 4720 during which backlight is shut off is acceptable as long as the period 4720 includes at least a period from the time 4721 to the time 4722, and may include a period of the next read operation.

When a potential 4711 of a first selection signal line is set to a high level at time 4723, an operation of reading pixels in the first row is started.

When at time 4724, the potential 4711 of the first selection signal line is set to a low level and a potential 4712 of a second selection signal line is set to a high level, an operation of reading pixels in the first row is completed and an operation of reading pixels in the second row is started.

When at time 4725, the potential 4712 of the second selection signal line is set to a low level and a potential 4713 of a third selection signal line is set to a high level, an operation of reading pixels in the second row is completed and an operation of reading pixels in the third row is started.

When the potential 4713 of the third selection signal line is set to a low level at time 4726, an operation of reading pixels in the third row is completed.

When a potential 4714 of an (n−1)th selection signal line is set to a high level at time 4727, an operation of reading pixels in the (n−1)th row is started.

When at time 4728, the potential 4714 of the (n−1)th selection signal line is set to a low level and a potential 4715 of an n-th selection signal line is set to a high level, an operation of reading pixels in the (n−1)th row is completed and an operation of reading pixels in the n-th row is started.

When the potential 4715 of the n-th selection signal line is set to a low level at time 4729, an operation of reading pixels in the n-th row is completed. After that, an operation at the time 4721 is performed and the same operations are repeated, so that a display device with high perception imaging can be provided.

Through the above steps, in an embodiment of the present invention, the global shutter system is used and backlight is shut off in the accumulation operation of the photosensor, so that an object can be further accurately detected. In addition, with the method of backlighting shutoff, the accumulation operation of the photosensor can be performed in all of the successive frames and perception accuracy of a touch panel can be improved.

Further, an object can be further accurately detected by performing the accumulation operation of a photosensor within a frame period in which a black image is displayed. In this case, the operation is similar to the operation which has been described with reference to FIG. 4, but backlighting shutoff is not necessary. In addition, this method is effective for driving the rolling shutter system in which accumulation time is long.

Further, backlighting shutoff or insertion of a black image display can provide what is called a black frame insertion effect to a display device, so that moving image display characteristics can be improved.

This embodiment can be implemented in combination with any of the other embodiments or the examples, as appropriate.

Embodiment 2

In this embodiment, systems of the accumulation operation and a read operation of an imaging device are described. Note that a display device in an embodiment of the present invention includes a photosensor portion and a function of an imaging device.

As a system of the accumulation operation and a read operation of the imaging device, the following two systems are known: the rolling shutter system and the global shutter system. Differences of these systems are briefly described using the potential of a charge accumulation control signal line and the potential of the selection signal line.

Figure 5:
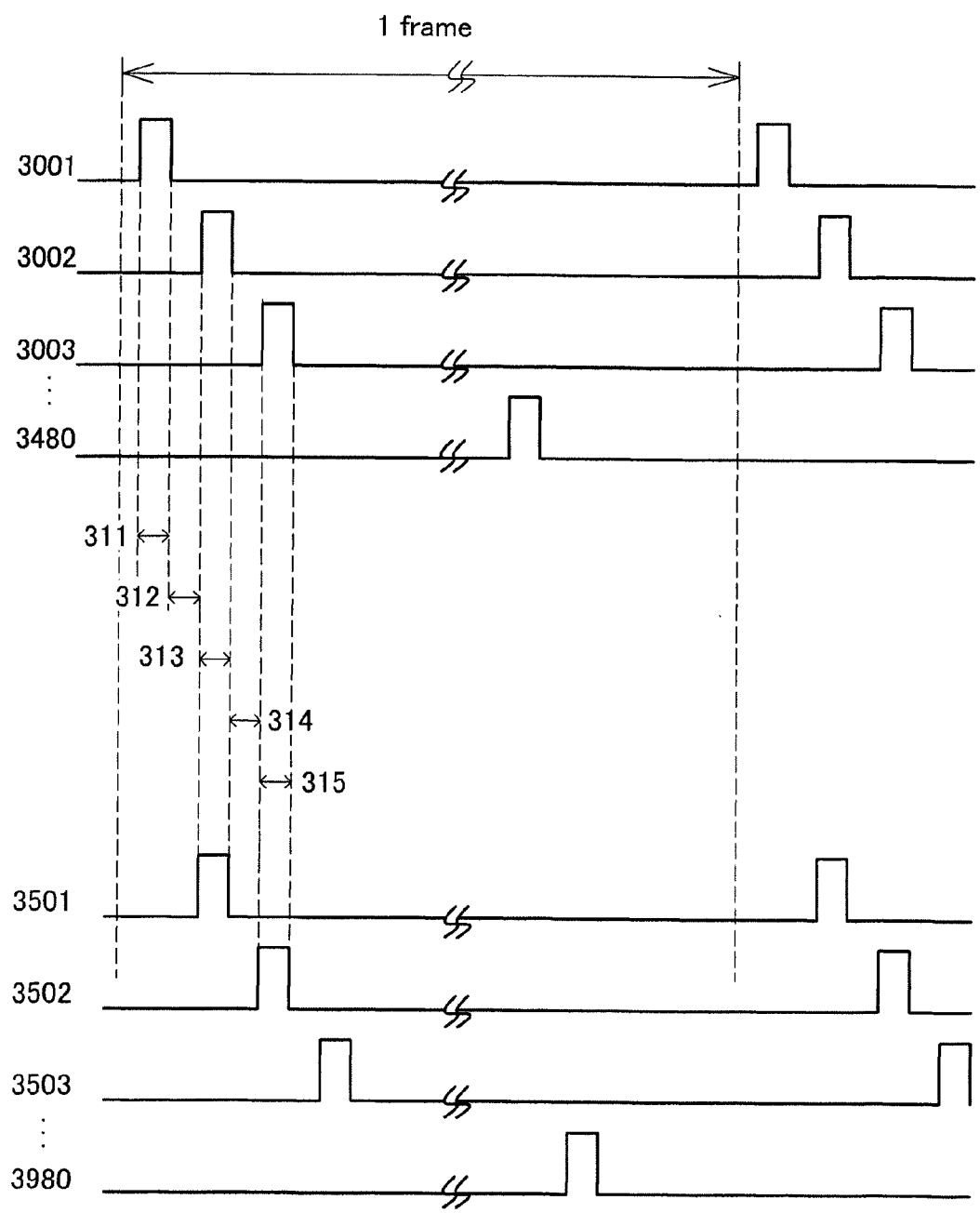
FIG. 5 is a timing chart of the operations of a photo sensor.

FIG. 5 is a timing chart of the case where the rolling shutter system is used. First, a potential 3001 of the first charge accumulation control signal line is set to a high level, and charge corresponding to the amount of light is accumulated in the signal charge accumulation portion in the pixel of the first row in an accumulation period 311. Next, the potential 3001 of the first charge accumulation control signal line is set to a low level, and a potential 3501 of the first selection signal line is set to a high level after a charge holding period 312. After voltage corresponding to an accumulation potential is read in a period 313, the potential 3501 of the first selection signal line is set to a low level.

In the period 313, a potential 3002 of the second charge accumulation control signal line is set to a high level, and charge corresponding to the amount of light is accumulated in the signal charge accumulation portion in the pixel of the second row. Next, the potential 3002 of the second charge accumulation control signal line is set to a low level, and a potential 3502 of the second selection signal line is set to a high level after a charge holding period 314. After voltage corresponding to the accumulation potential is read in a period 315, the potential 3502 of the second selection signal line is set to a low level.

Similarly, when the last row is for example, the 480th row, potentials from a potential 3003 of the third charge accumulation control signal line to a potential 3480 of the 480th charge accumulation control signal line and potentials from a potential 3503 of the third selection signal line to a potential 3980 of the 480th charge accumulation control signal line are controlled sequentially, whereby the read operation in all the pixels is performed. In this manner, reading of one frame is completed.

In the rolling shutter system, charge accumulation to the signal charge accumulation portion in the pixel is performed per row; therefore, the timing of charge accumulation is different from each row. In other words, the rolling shutter system is a system in which the accumulation operation of charge is not performed in all the pixels at the same time and a time difference of the accumulation operation occurs per row. Note that a charge holding period from the accumulation operation to the read operation is the same in all the rows.

Figure 6:
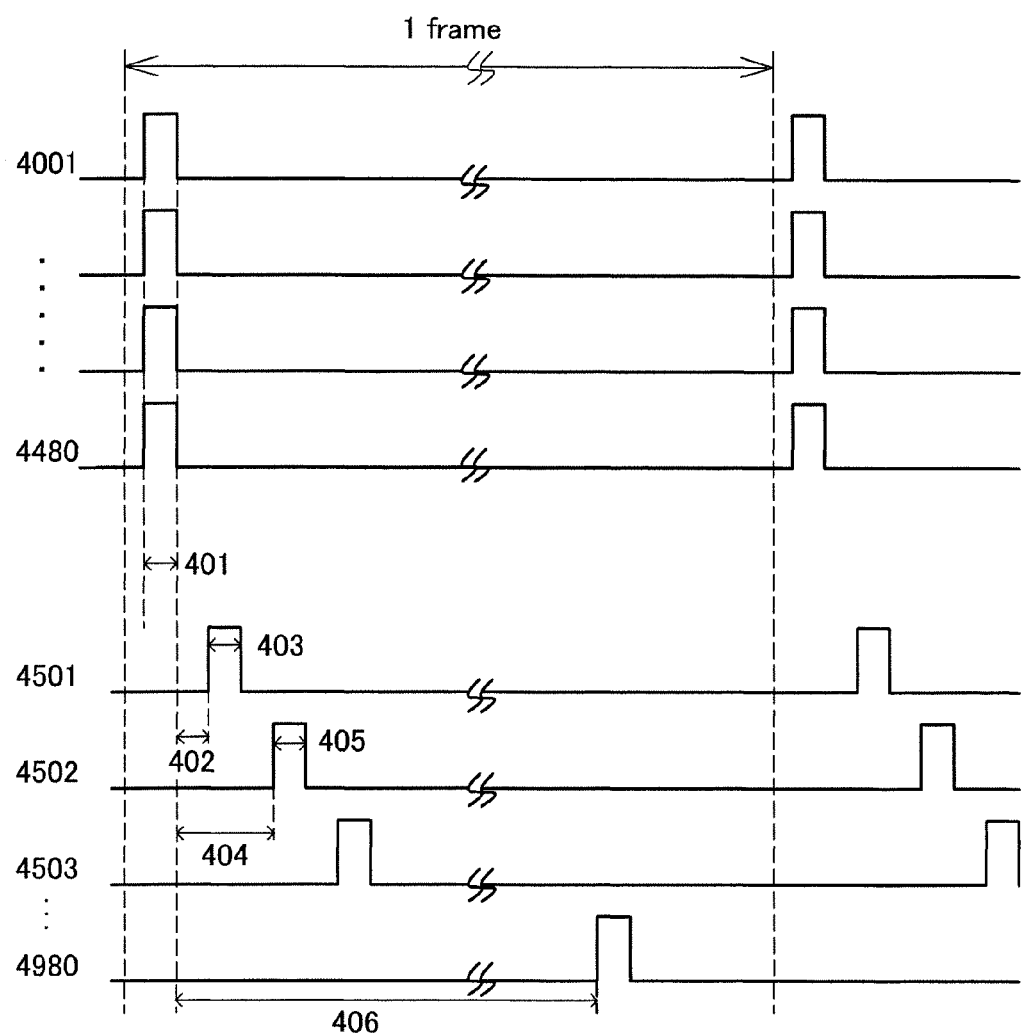
FIG. 6 is a timing chart of the operations of a photo sensor.

Next, the global shutter system is described using a timing chart of FIG. 6. Similarly to the above-described example, when the last row is the 480th row, potentials from a potential 4001 of the first charge accumulation control signal line of the first row to a potential 4480 of the 480th charge accumulation control signal line of the 480th row are set to high levels at the same time, whereby the accumulation operation of charge is performed in all the pixels in a period 401 at the same time. In a period 403 after a charge holding period 402, a potential 4501 of the first selection signal line is set to a high level, the pixel of the first row is selected, and voltage corresponding to the accumulation potential is output.

Next, the potential 4501 of the selection signal line is set to a low level. In a period 405 after a charge holding period 404, a potential 4502 of the second selection signal line is set to a high level, the pixel of the second row is selected, and voltage corresponding to the accumulation potential is output.

After that, reading of each row is performed sequentially. In the last row, the potential of the 480th selection signal line 4980 is set to a high level after a charge holding period 406, the pixel of the 480th row is selected, and voltage corresponding to the accumulation potential is output. In this manner, reading of one frame is completed.

In the global shutter system, the timing of the charge accumulation to the signal charge accumulation portion is the same in all the pixels. Note that the period of time from the charge accumulation operation to the read operation is different from each row, and the charge holding period 406 up to the reading of the last row is the longest.

As described above, the global shutter system is advantageous in that an image can be taken out without a distortion with respect to an object with movement because there is no time difference of the charge accumulation in all the pixels. However, the charge holding period is longer; therefore, there is a problem in that a sensor is easily affected by leakage due to the off-state current of a charge accumulation control transistor or a reset transistor or the like, as compared to the rolling shutter system.

Figure 7A:
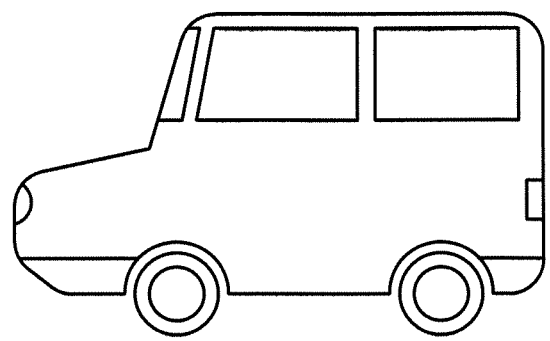
FIGS. 7A to 7C each illustrate imaging examples of a rolling shutter system and a global shutter system.

Next, examples of taking images using the rolling shutter system and the global shutter system are described with reference to FIGS. 7A to 7C. Here, as an example of the case where an object moves fast, the case where an image of a moving car as illustrated in FIG. 7A is taken out is considered.

Figure 7B:
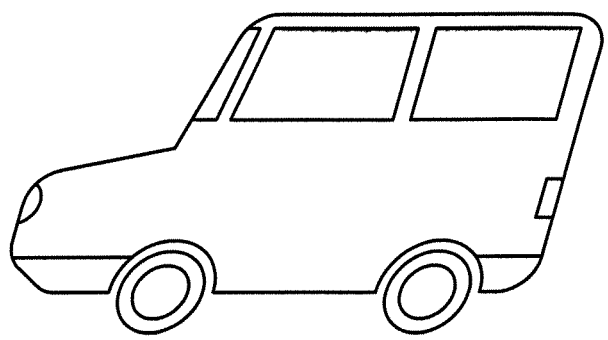
Figure 7C:
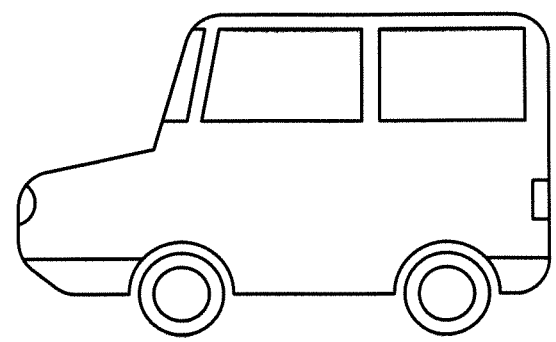

In the case where the rolling shutter system is used, the timing of the charge accumulation of the pixel is different from each row; therefore, imaging of the upper part of an image and imaging of the lower part of the image cannot be performed at the same time, and the image is generated as a distorted object as illustrated in FIG. 7B. In the rolling shutter system, a distortion of a taken-out image increases in particular when an object which moves fast is perceived; therefore, it is difficult to take an image of the actual shape of the object.

In contrast, in the case where the global shutter system is used, the timing of the charge accumulation of the pixel is the same in all the pixels. Therefore, the whole image can be taken out instantaneously; therefore, an image without distortion as illustrated in FIG. 7C can be taken out. The global shutter system is an excellent system for taking an image of an object which moves fast.

As described above, it is found that not the rolling shutter system but the global shutter system is suitable for taking an image of an object which moves fast. Note that a normal image cannot be taken out just by a change from the rolling shutter system to the global shutter system in a CMOS image sensor because of the large off-state current of the conventional transistor including a silicon semiconductor.

In order to solve this problem, it is preferable that a transistor having low off-state current be used for a transistor connected to the signal charge accumulation portion. As the transistor having extremely low off-state current, a transistor including an oxide semiconductor or the like is given.

Next, scientific calculation results on an image are described. An object used for the scientific calculation is an image with three blades to serve as a rotor illustrated in FIG. 8A. These three blades can rotate using a connection point as a central axis. This scientific calculation aims at taking an image for one frame when an image of three rotating blades is taken out.

The software used for the scientific calculation is image processing software written in C language, which is used for calculating the timing of a charge accumulation operation and of a read operation in each pixel of an image sensor and the amount of leakage from a signal charge accumulation portion per row to create a picture.

FIGS. 8B to 8E illustrate the scientific calculation results. Note that the scientific calculation was performed under the following four conditions.

Figure 28:
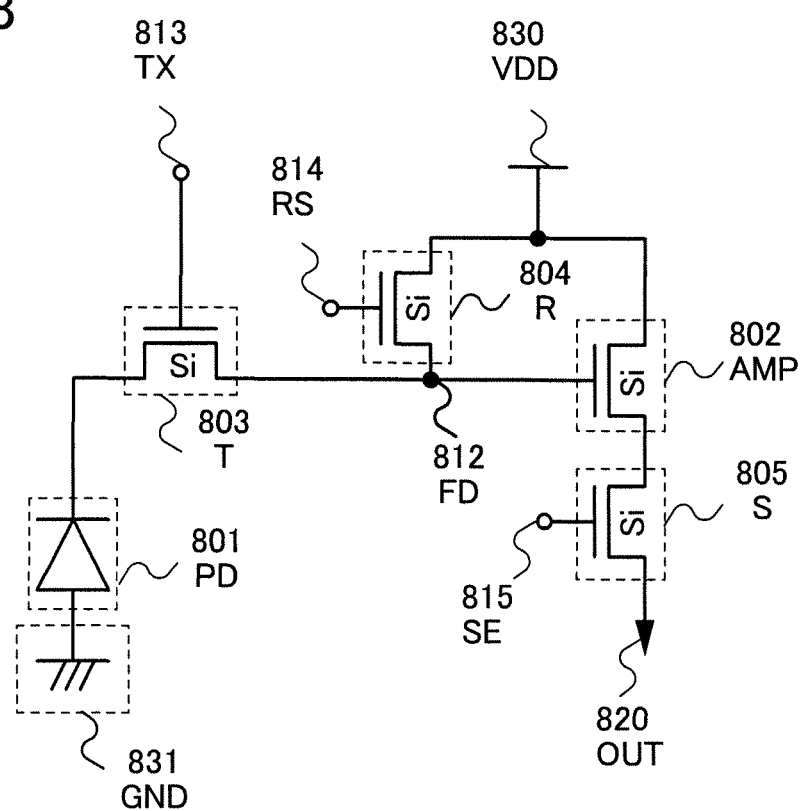
FIG. 28 illustrates a circuit structure of a pixel of a photosensor.

The first condition is the VGA image sensor (photosensor) which has a pixel circuit illustrated in FIG. 28 and drives the rolling shutter system. In the pixel circuit structure of FIG. 28, a charge accumulation control transistor 803, a reset transistor 804, an amplifying transistor 802, and a selection transistor 805 are transistors including a silicon semiconductor.

The second condition is the VGA image sensor which has the pixel circuit of FIG. 28 and drives the global shutter system. The structure of the circuit is the same as that of the first condition, and only a shutter system is different.

Figure 29:
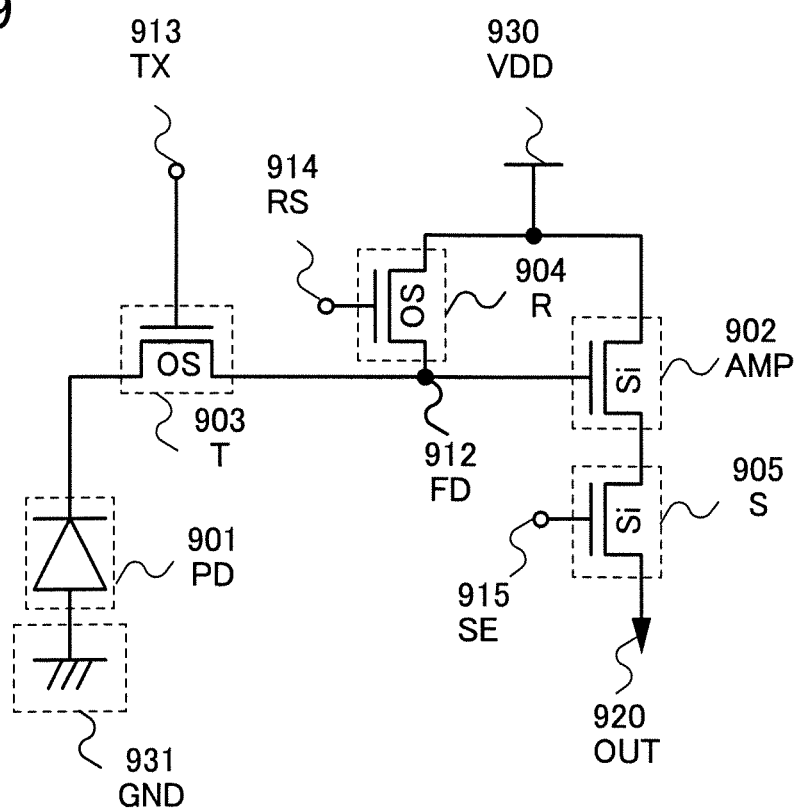
FIG. 29 illustrates a circuit structure of a pixel of a photosensor.

The third condition is the VGA image sensor which has a pixel circuit of FIG. 29 and drives the rolling shutter system. Although a pixel circuit structure of FIG. 29 is basically the same as that of the pixel circuit of the photosensor portion 106 in FIG. 2, a charge accumulation control transistor 903 and a reset transistor 904 are transistors including an oxide semiconductor, whereas an amplifying transistor 902 and a selection transistor 905 are transistors including a silicon semiconductor.

The fourth condition is the VGA image sensor which has the pixel circuit of FIG. 29 and drives the global shutter system. The structure of a circuit is the same as that of the third condition, and only a shutter system is different.

Note that each transistor including a silicon semiconductor in the pixel circuits of FIG. 28 and FIG. 29 had a channel length L of 3 μm, a channel width W of 5 μm, and a thickness d of a gate insulating film of 20 nm. In addition, each transistor including an oxide semiconductor had a channel length L of 3 μm, a channel width W of 5 μm, and a thickness d of a gate insulating film of 200 nm.

Further, an imaging frequency was set to 60 Hz, and the electrical characteristics of the transistor including a silicon semiconductor satisfied Icut=10 pA, and the electrical characteristics of the transistor including an oxide semiconductor satisfied Icut=0.1 aA. The term Icut in this embodiment means the amount of current flowing between a source and a drain when gate voltage is set to 0 V and drain voltage is set to 5 V.

Figure 8A:
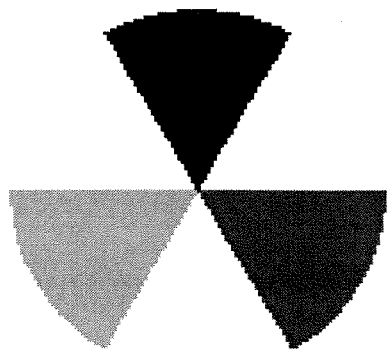
FIGS. 8A to 8E are diagrams illustrating scientific computation.

The condition of rotational movement of the three blades shown in FIG. 8A was set to 640 rpm in a clockwise direction. Note that when the number of rotations is 640 rpm, the three blades rotate by approximately 60 degrees during one frame (1/60 s) at the time of the accumulation operation of the rolling shutter.

Figure 8B:
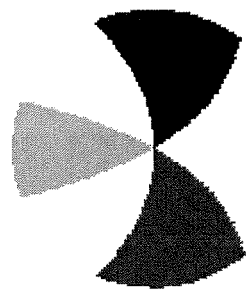

In the case of the first condition (the transistors were only silicon semiconductor transistors and the rolling shutter system was driven), the timing to accumulate charge in the signal charge accumulation portion of the pixel is different from each row; therefore, a distortion occurs in an image as illustrated in FIG. 8B.

Figure 8C:
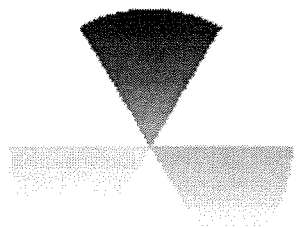

In the case of the second condition (the transistors were only silicon semiconductor transistors and the global shutter system was driven), a change of grayscale is seen as illustrated in FIG. 8C, which is caused by charge leakage due to the off-state current of the charge accumulation control transistor 803 and the reset transistor 804. The charge holding period gets longer as it is closer to the last row on the lower side; therefore, the change becomes remarkable.

Figure 8D:
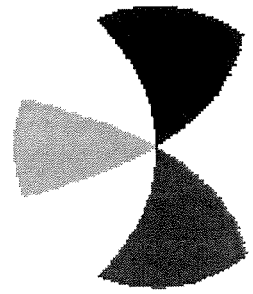

In the case of the third condition (the charge accumulation control transistor and the reset transistor were oxide semiconductor transistors, and the rolling shutter system was driven), an image is distorted as illustrated in FIG. 8D, which is similar to the case of the first condition.

Figure 8E:
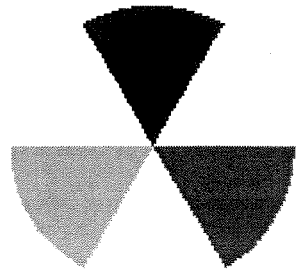

In the case of the fourth condition (the charge accumulation control transistor and the reset transistor were oxide semiconductor transistors, and the global shutter system was driven), there is little charge leakage due to the off-state current of the transistor and the grayscale is displayed properly as illustrated in FIG. 8E as in FIG. 8A.

Figure 9:
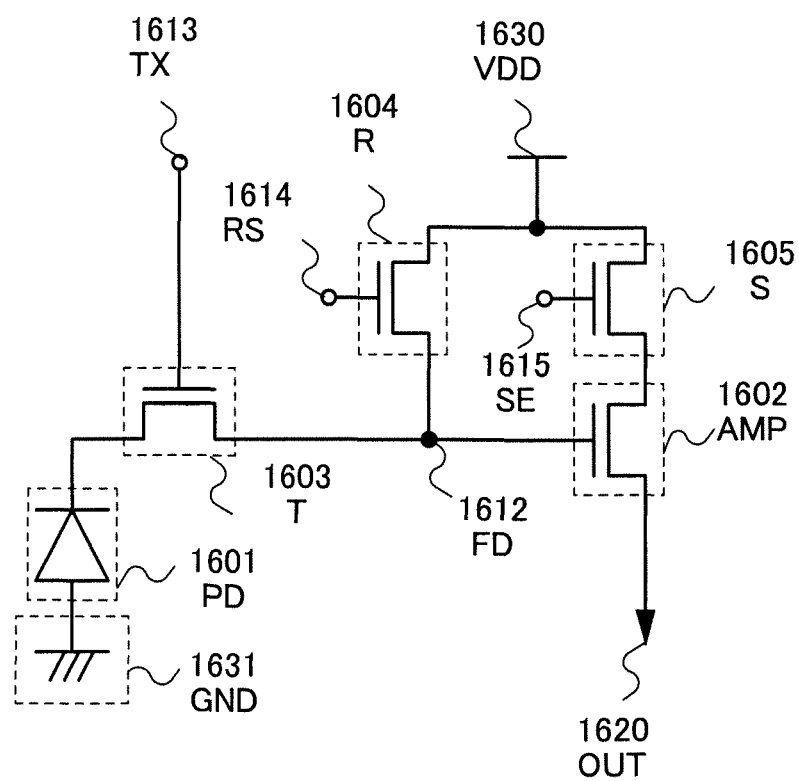
FIG. 9 illustrates a circuit structure of a pixel of a photosensor.
Figure 10:
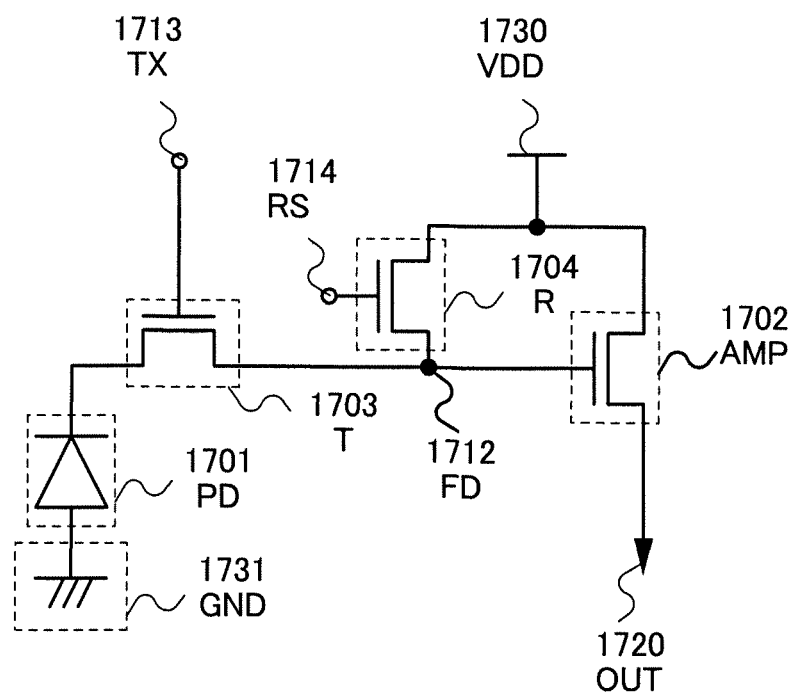
FIG. 10 illustrates a circuit structure of a pixel of a photosensor.

It is found from the results illustrated in FIGS. 8B to 8E that the rolling shutter system causes an image distortion in either pixel circuit of FIG. 9 or FIG. 10 and there is no strong correlation between the distortion of the image and the off-state current. In other words, in order to decrease the distortion of the image, it is effective to drive the global shutter system by which the timing to accumulate charge in the signal charge accumulation portion of the pixel is the same in all the pixels.

However, when a circuit is formed using a conventional transistor including a silicon semiconductor, it is found that the global shutter system has a problem in that a grayscale varies because of charge leakage due to the off-state current of the charge accumulation control transistor and the reset transistor.

On the other hand, in the case where a transistor including an oxide semiconductor is used for the charge accumulation control transistor and the reset transistor, it is found that charge is prevented from flowing out by the extremely low off-state current, and grayscale is correctly displayed. Therefore, an imaging device having a pixel circuit provided with a transistor including an oxide semiconductor can easily drive the global shutter system.

This embodiment can be implemented in combination with any of the other embodiments or the examples, as appropriate.

Embodiment 3

In this embodiment, a circuit structure of a photosensor portion of a display device which is one embodiment of the present invention is described.

In a display device of an embodiment of the present invention, various circuits can be used for the photosensor portion. In this embodiment, a circuit structure other than the circuit structure of the photosensor portion 106 illustrated in FIG. 2 of Embodiment 1 is described.

Note that the names of the transistor and the wirings which are described in this embodiment are conveniently named; therefore, any of names is acceptable as long as functions of the transistors and the wirings are described.

Figure 2:
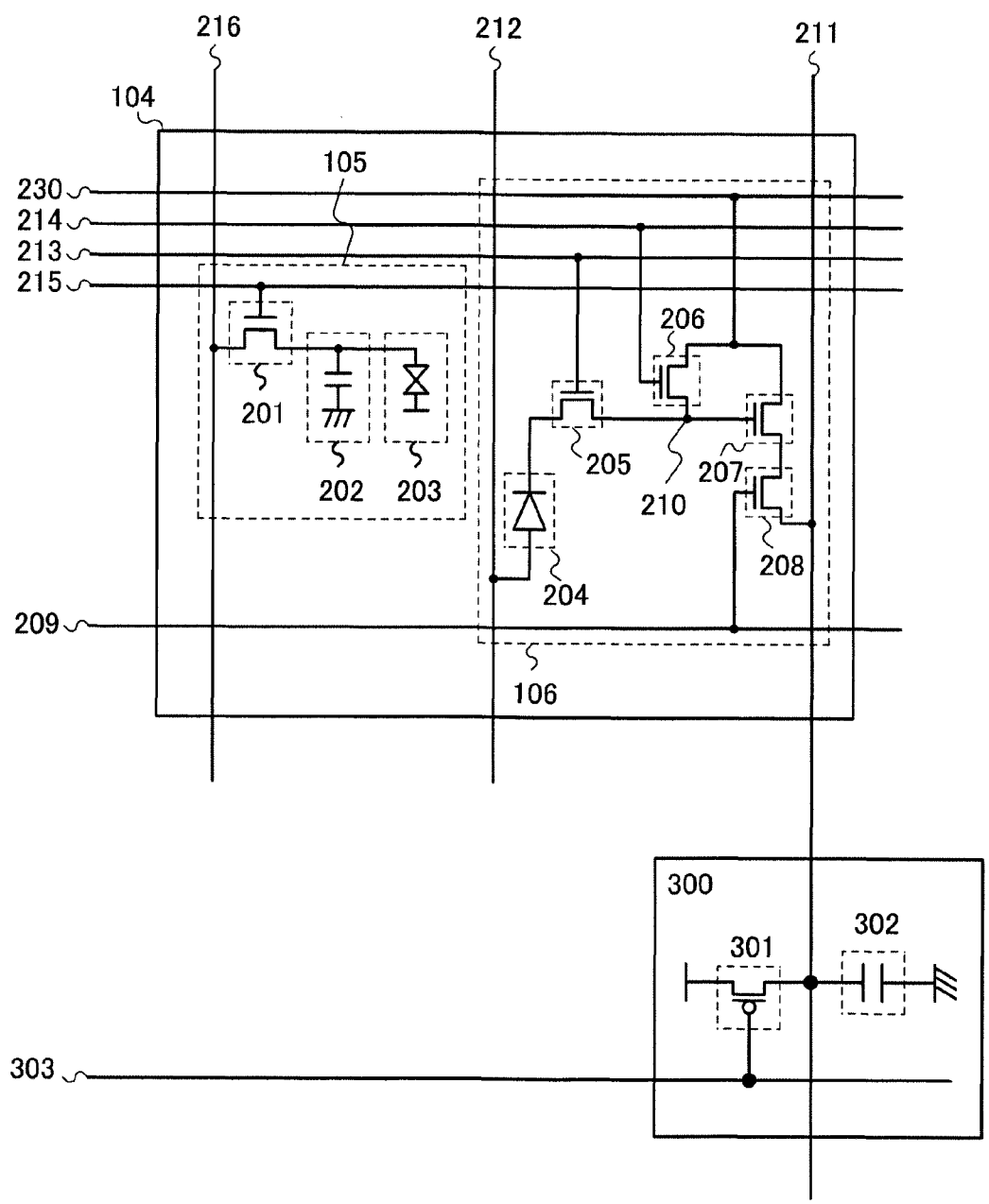
FIG. 2 is a circuit diagram having a structure of a display device where a display region is provided with both a display element and a photosensor.

FIG. 9 is a pixel circuit structure of four transistors, which is similar to that in the photosensor portion 106 in FIG. 2. A pixel circuit is formed with a photodiode 1601, an amplifying transistor 1602, a charge accumulation control transistor 1603, a reset transistor 1604, and a selection transistor 1605. The circuit structure of FIG. 9 is different from that of FIG. 1 in the position of the selection transistor 1605.

A gate of the charge accumulation control transistor 1603 is connected to a charge accumulation control signal line 1613, one of a source and a drain of the charge accumulation control transistor 1603 is connected to a cathode of the photodiode 1601, and the other of the source and the drain of the charge accumulation control transistor 1603 is connected to a signal charge accumulation portion 1612. An anode of the photodiode 1601 is connected to a reference signal line 1631.

A gate of the amplifying transistor 1602 is connected to the signal charge accumulation portion 1612, one of a source and a drain of the amplifying transistor 1602 is connected to one of a source and a drain of the selection transistor 1605, and the other of the source and the drain of the amplifying transistor 1602 is connected to an output signal line 1620.

A gate of the reset transistor 1604 is connected to a reset signal line 1614, one of a source and a drain of the reset transistor 1604 is connected to a power supply line 1630, and the other of the source and the drain of the reset transistor 1604 is connected to the signal charge accumulation portion 1612.

A gate of the selection transistor 1605 is connected to a selection signal line 1615, and the other of the source and the drain of the selection transistor 1605 is connected to the power supply line 1630. Here, a charge holding capacitor may be connected to between the signal charge accumulation portion 1612 and the reference signal line 1631.

Next, functions of the elements forming the pixel circuit of FIG. 9 are described. The photodiode 1601 generates current in accordance with the amount of light incident on the pixel. The amplifying transistor 1602 outputs a signal which corresponds to the potential of the signal charge accumulation portion 1612. The charge accumulation control transistor 1603 controls charge accumulation in the signal charge accumulation portion 1612 performed by the photodiode 1601. The reset transistor 1604 controls the initialization of the potential of the signal charge accumulation portion 1612. The selection transistor 1605 controls the selection of the pixel in reading. The signal charge accumulation portion 1612 is a charge holding node, and holds charge which varies depending on the amount of light received by the photodiode 1601.

The charge accumulation control signal line 1613 is a signal line which controls the charge accumulation control transistor 1603. The reset signal line 1614 is a signal line which controls the reset transistor 1604. The selection signal line 1615 is a signal line which controls the selection transistor 1605. The output signal line 1620 is a signal line to serve as an output destination of a signal generated by the amplifying transistor 1602. The power supply line 1630 is a signal line which supplies power supply voltage. The reference signal line 1631 is a signal line which sets a reference potential.

The operation of the pixel circuit illustrated in FIG. 9 is similar to the operation of the pixel circuit of the photosensor portion 106 in FIG. 2 described in Embodiment 1.

Next, a pixel circuit structure of three transistors illustrated in FIG. 10 is described. A pixel circuit is formed with a photodiode 1701, an amplifying transistor 1702, a charge accumulation control transistor 1703, and a reset transistor 1704.

A gate of the charge accumulation control transistor 1703 is connected to a charge accumulation control signal line 1713, one of a source and a drain of the charge accumulation control transistor 1703 is connected to a cathode of the photodiode 1701, and the other of the source and the drain of the charge accumulation control transistor 1703 is connected to a signal charge accumulation portion 1712. An anode of the photodiode 1701 is connected to a reference signal line 1731.

A gate of the amplifying transistor 1702 is connected to the signal charge accumulation portion 1712, one of a source and a drain of the amplifying transistor 1702 is connected to a power supply line 1730, and the other of the source and the drain of the amplifying transistor 1702 is connected to an output signal line 1720.

A gate of the reset transistor 1704 is connected to a reset signal line 1714, one of a source and a drain of the reset transistor 1704 is connected to the power supply line 1730, and the other of the source and the drain of the reset transistor 1704 is connected to the signal charge accumulation portion 1712. Here, a charge holding capacitor may be connected to between the signal charge accumulation portion 1712 and the reference signal line 1731.

Next, functions of the elements forming the pixel circuit of FIG. 10 are described. The photodiode 1701 generates current in accordance with the amount of light incident on the pixel. The amplifying transistor 1702 outputs a signal which corresponds to the potential of the signal charge accumulation portion 1712. The charge accumulation control transistor 1703 controls charge accumulation in the signal charge accumulation portion 1712 performed by the photodiode 1701. The reset transistor 1704 controls the initialization of the potential of the signal charge accumulation portion 1712. The signal charge accumulation portion 1712 is a charge holding node, and holds charge which varies depending on the amount of light received by the photodiode 1701.

The charge accumulation control signal line 1713 is a signal line which controls the charge accumulation control transistor 1703. The reset signal line 1714 is a signal line which controls the reset transistor 1704. The output signal line 1720 is a signal line to serve as an output destination of a signal generated by the amplifying transistor 1702. The power supply line 1730 is a signal line which supplies power supply voltage. The reference signal line 1731 is a signal line which sets a reference potential.

Figure 11:
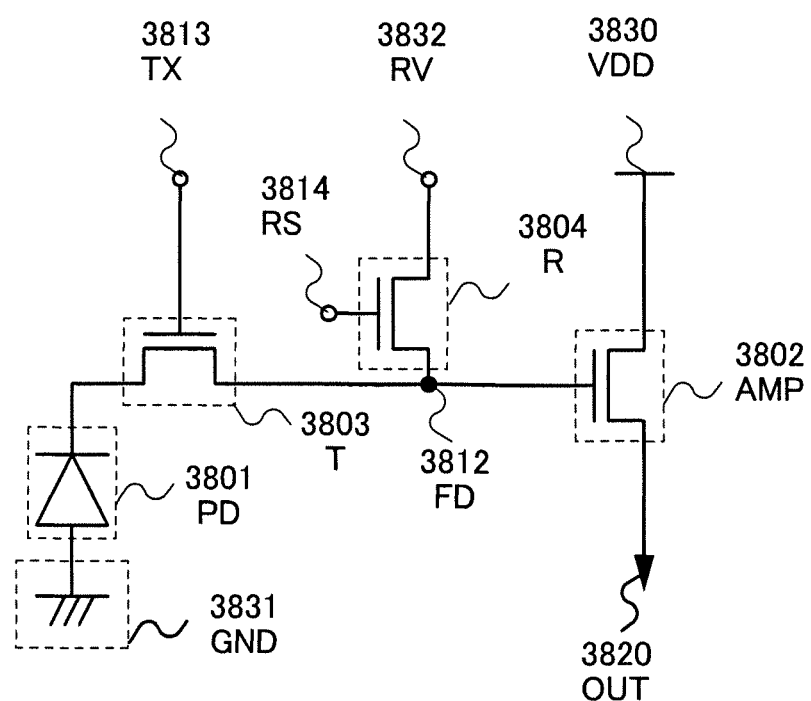
FIG. 11 illustrates a circuit structure of a pixel of a photosensor.

A pixel circuit structure of three transistors, which is different from that in FIG. 10, is illustrated in FIG. 11. A pixel circuit includes a photodiode 3801, an amplifying transistor 3802, a charge accumulation control transistor 3803, and a reset transistor 3804.

A gate of the charge accumulation control transistor 3803 is connected to a charge accumulation control signal line 3813, one of a source and a drain of the charge accumulation control transistor 3803 is connected to a cathode of the photodiode 3801, and the other of the source and the drain of the charge accumulation control transistor 3803 is connected to a signal charge accumulation portion 3812. An anode of the photodiode 3801 is connected to a reference signal line 3831.

A gate of the amplifying transistor 3802 is connected to the signal charge accumulation portion 3812, one of a source and a drain of the amplifying transistor 3802 is connected to a power supply line 3830, and the other of the source and the drain of the amplifying transistor 3802 is connected to an output signal line 3820.

A gate of the reset transistor 3804 is connected to a reset signal line 3814, one of a source and a drain of the reset transistor 3804 is connected to a reset power supply line 3832, and the other of the source and the drain of the reset transistor 3804 is connected to the signal charge accumulation portion 3812. Here, a charge holding capacitor may be connected to between the signal charge accumulation portion 3812 and the reference signal line 3831.

Next, functions of the elements forming the pixel circuit of FIG. 11 are described. The photodiode 3801 generates current in accordance with the amount of light incident on the pixel. The amplifying transistor 3802 outputs a signal which corresponds to the potential of the signal charge accumulation portion 3812. The charge accumulation control transistor 3803 controls charge accumulation in the signal charge accumulation portion 3812 performed by the photodiode 3801. The reset transistor 3804 controls the initialization of the potential of the signal charge accumulation portion 3812. The signal charge accumulation portion 3812 is a charge holding node, and holds charge which varies depending on the amount of light received by the photodiode 3801.

The charge accumulation control signal line 3813 is a signal line which controls the charge accumulation control transistor 3803. The reset signal line 3814 is a signal line which controls the reset transistor 3804. The output signal line 3820 is a signal line to serve as an output destination of a signal generated by the amplifying transistor 3802. The reset power supply line 3832 is a power supply line which is different from the power supply line 3830, and the reset power supply line 3832 can initialize the potential of the signal charge accumulation portion 3812, which is different from the potential of the power supply line 3830. The power supply line 3830 is a signal line which supplies power supply voltage. The reference signal line 3831 is a signal line which sets a reference potential.

Figure 12A:
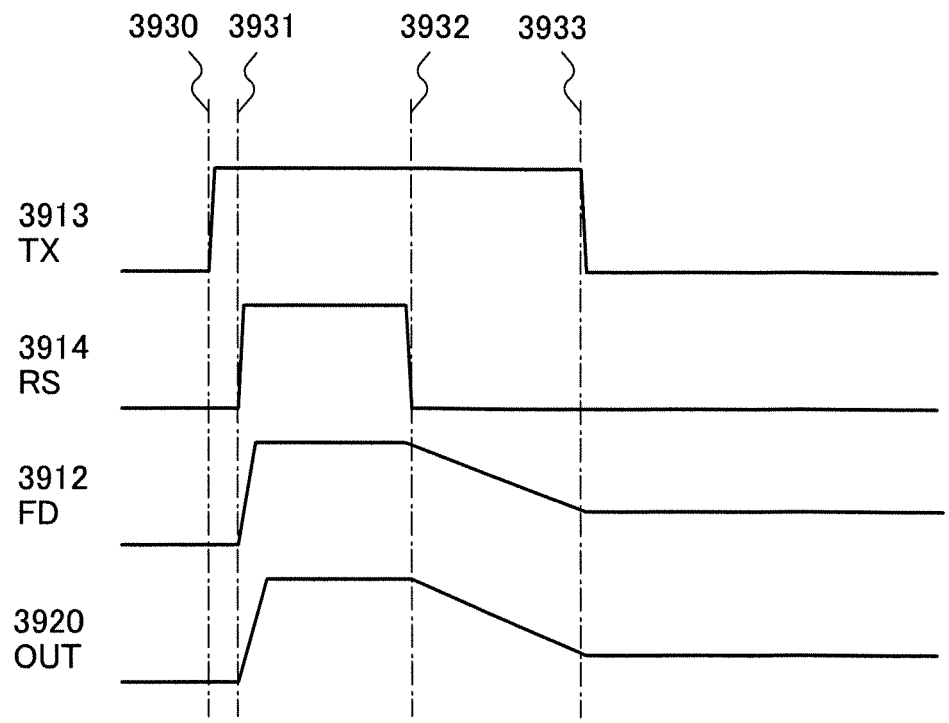
FIGS. 12A and 12B are timing charts each illustrating operation of a pixel circuit of a photosensor.
Figure 12B:
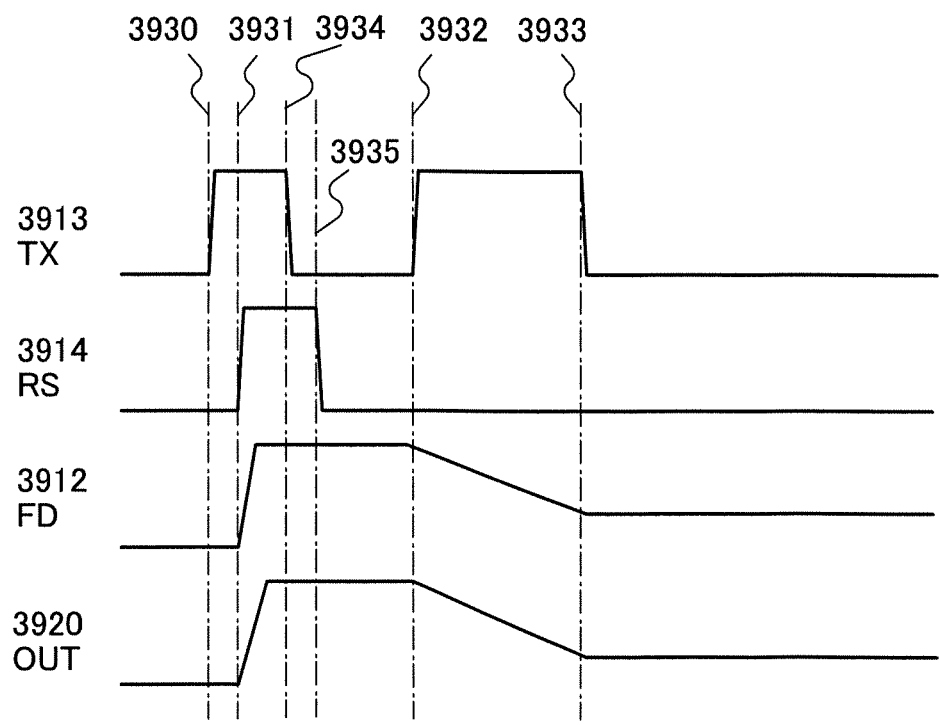

Next, the operations of the pixel circuits of FIG. 10 and FIG. 11 are described using timing charts shown in FIGS. 12A and 12B. Note that the operation of the circuit illustrated in FIG. 10 is basically the same as that in FIG. 11; therefore, the structure of FIG. 10 is described here.

For simple description in FIGS. 12A and 12B, a potential 3913 of the charge accumulation control signal line 1713 and a potential 3914 of the reset signal line 1714 are signals which vary between two levels. Note that because each potential is an analog signal, the potential can, in practice, have various levels in accordance with situations without limitation on two levels.

First, an operation mode according to FIG. 12A is described.

The potential 3913 of the charge accumulation control signal line 1713 is set to a high level at time 3930. Next, when the potential 3914 of the charge accumulation control signal line 1714 is set to a high level again at time 3931, the potential of the power supply line 1730 connected to one of a source and a drain of the reset transistor 1704 is supplied as a potential 3912 of the signal charge accumulation portion 1712. These steps are referred to as the reset operation.

When the potential 3914 of a reset signal line 1714 is set to a low level at time 3932, the potential 3912 of the signal charge accumulation portion holds the same potential as the potential of the power supply line 1730, whereby a reverse bias is applied to the photodiode 1701. At this stage, the accumulation operation starts.

Then, because the reverse current corresponding to the amount of light flows to the photodiode 1701, the amount of charge accumulated in the signal charge accumulation portion 1712 varies in accordance with the amount of light. At the same time, charge is supplied from the power supply line 1730 to the output signal line 1720 in accordance with the potential 3912 of the signal charge accumulation portion 1712. At this stage, the read operation starts.

When the potential 3913 of the charge accumulation control signal line 1713 is set to a low level at time 3933, transfer of charge from the signal charge accumulation portion 1712 to the photodiode 1701 stops, whereby the amount of charge accumulated in the signal charge accumulation portion 1712 is determined. Here, the accumulation operation is terminated.

Then, charge supplied from the power supply line 1730 to the output signal line 1720 is stopped, and a potential 3920 of the output signal line is determined. Here, the read operation is terminated.

Next, an operation mode according to FIG. 12B is described.

The potential 3913 of the charge accumulation control signal line 1713 is set to a high level at the time 3930. Next, when the potential 3914 of the reset signal line 1714 is set to a high level at the time 3931, the potential 3912 of the signal charge accumulation portion 1712 and the potential of the cathode of the photodiode 1701 are initialized to the potential of the power supply line 1730 connected to one of the source and the drain of the reset transistor 1704. These steps are referred to as the reset operation.

When the potential 3913 of the charge accumulation control signal line 1713 is set to a low level at time 3934 and then the potential 3914 of the reset signal line 1714 is set to a low level at time 3935, the reset operation is terminated; accordingly, reverse current corresponding to the amount of light flows to the photodiode to which the reverse bias is applied, whereby the potential of the cathode of the photodiode 1701 varies.

When the potential 3913 of the charge accumulation control signal line 1713 is set to a high level again at the time 3932, current flows by a potential difference between the potential 3912 of the signal charge accumulation portion 1712 and the potential of the cathode of the photodiode 1701, and the potential 3912 of the signal charge accumulation portion 1712 varies.

The steps after that are the same as those of the operation mode according to FIG. 12A.

Next, a pixel circuit structure of three transistors, which is different from that described above, is illustrated in FIG. 13. A pixel circuit is formed with a photodiode 2001, an amplifying transistor 2002, a charge accumulation control transistor 2003, and a reset transistor 2004. An anode of the photodiode 2001 is connected to a reference signal line 2031.

A gate of the charge accumulation control transistor 2003 is connected to a charge accumulation control signal line 2013, one of a source and a drain of the charge accumulation control transistor 2003 is connected to a cathode of the photodiode 2001, and the other of the source and the drain of the charge accumulation control transistor 2003 is connected to a signal charge accumulation portion 2012.

A gate of the amplifying transistor 2002 is connected to the signal charge accumulation portion 2012, one of a source and a drain of the amplifying transistor 2002 is connected to a power supply line 2030, and the other of the source and the drain of the amplifying transistor 2002 is connected to an output signal line 2020.

A gate of the reset transistor 2004 is connected to a reset signal line 2014, one of a source and a drain of the reset transistor 2004 is connected to the signal charge accumulation portion 2012, and the other of the source and the drain of the reset transistor 2004 is connected to the output signal line 2020. Here, a charge holding capacitor may be connected to between the signal charge accumulation portion 2012 and the reference signal line 2031.

Figure 13:
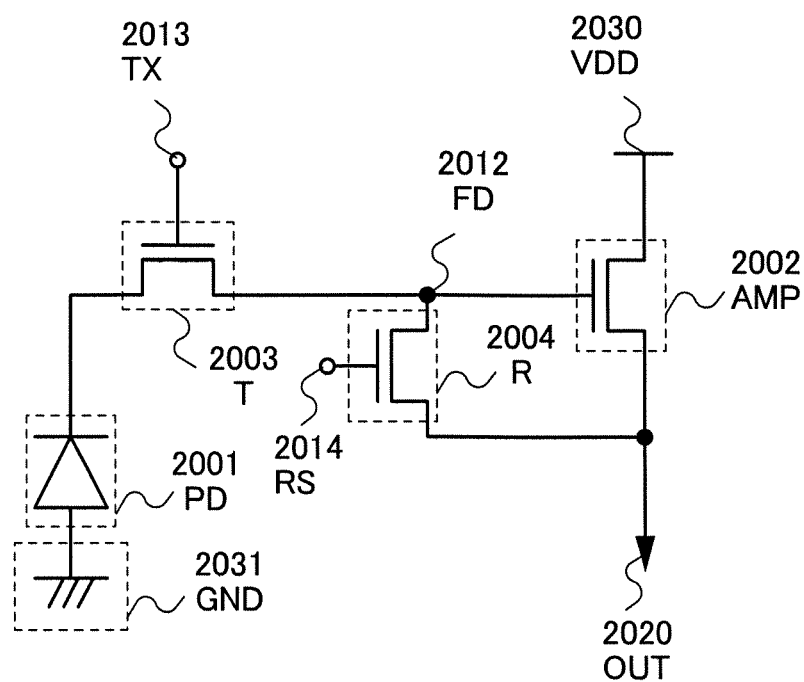
FIG. 13 illustrates a circuit structure of a pixel of a photosensor.

Next, functions of the elements forming the pixel circuit of FIG. 13 are described. The photodiode 2001 generates current in accordance with the amount of light incident on the pixel. The amplifying transistor 2002 outputs a signal which corresponds to the potential of the signal charge accumulation portion 2012. The charge accumulation control transistor 2003 controls charge accumulation in the signal charge accumulation portion 2012 performed by the photodiode 2001. The reset transistor 2004 controls the initialization of the potential of the signal charge accumulation portion 2012. The signal charge accumulation portion 2012 is a charge holding node, and holds charge which varies depending on the amount of light received by the photodiode 2001.

The charge accumulation control signal line 2013 is a signal line which controls the charge accumulation control transistor 2003. The reset signal line 2014 is a signal line which controls the reset transistor 2004. The output signal line 2020 is a signal line to serve as an output destination of a signal generated by the amplifying transistor 2002. The power supply line 2030 is a signal line which supplies power supply voltage. The reference signal line 2031 is a signal line which sets a reference potential.

Figure 14A:
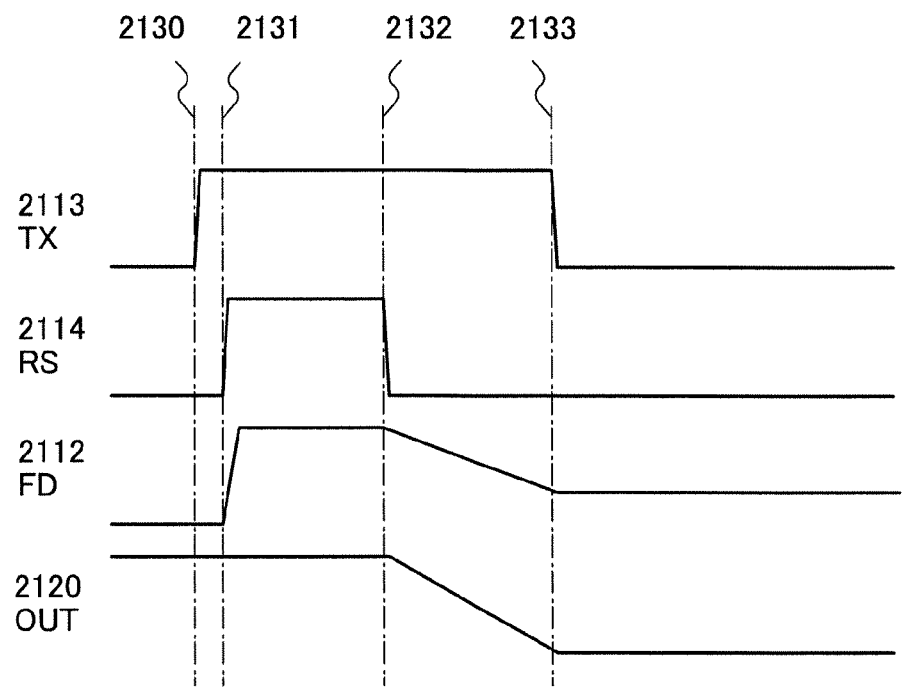
FIGS. 14A and 14B are timing charts each illustrating operation of a pixel circuit of a photosensor.
Figure 14B:
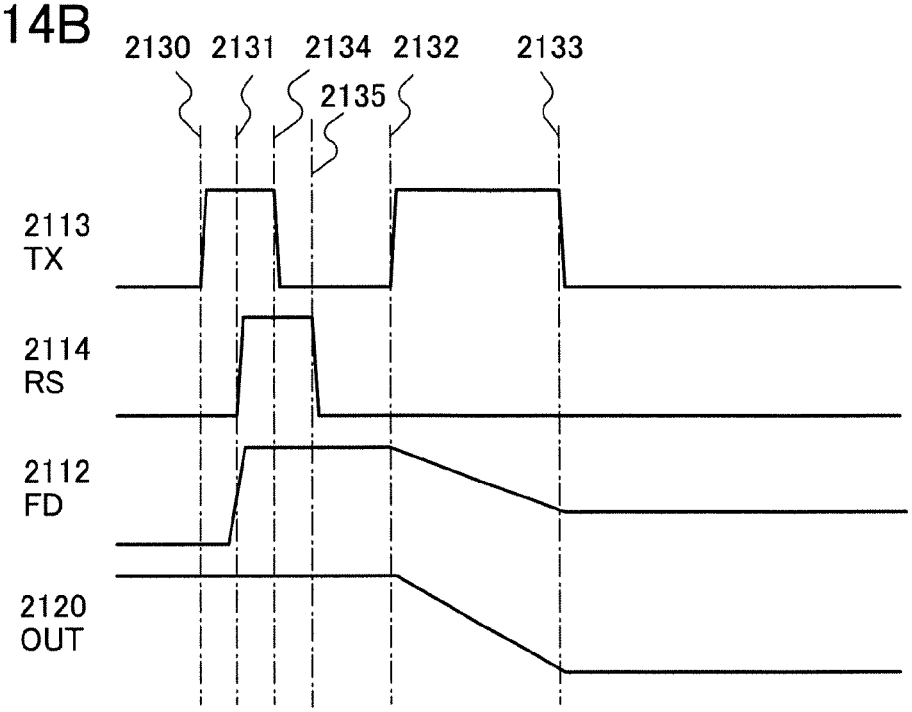

Next, the operations of the pixel circuits of FIG. 13 are described using timing charts shown in FIGS. 14A and 14B.

For simple description in FIGS. 14A and 14B, a potential 2113 of the charge accumulation control signal line 2013 and a potential 2114 of the reset signal line 2014 are signals which vary between two levels. Note that because each potential is an analog signal, the potential can, in practice, have various levels in accordance with situations without limitation on two levels.

First, an operation mode according to FIG. 14A is described.

The potential 2113 of the charge accumulation control signal line 2013 is set to a high level at time 2130. Next, when the potential 2114 of the reset signal line 2014 is set to a high level again at time 2131, a reset potential is supplied from a potential 2120 of the output signal line 2020 connected to the other of the source and the drain of the reset transistor 2004 to the signal charge accumulation portion 2012 as a potential 2112 of the signal charge accumulation portion 2012. These steps are referred to as the reset operation.

When the potential 2114 of a reset signal line 2014 is set to a low level at time 2132, the potential 2112 of the signal charge accumulation portion 2012 holds the reset potential, whereby a reverse bias is applied to the photodiode 2001. At this stage, the accumulation operation starts.

Then, because the reverse current corresponding to the amount of light flows to the photodiode 2001, the amount of charge accumulated in the signal charge accumulation portion 2012 varies in accordance with the amount of light. At the same time, charge is supplied from the power supply line 2030 to the output signal line 2020 in accordance with the potential 2112 of the signal charge accumulation portion 2012. At this stage, the read operation starts.

When the potential 2113 of the charge accumulation control signal line 2013 is set to a low level at time 2133, transfer of charge from the signal charge accumulation portion 2012 to the photodiode 2001 stops, whereby the amount of charge accumulated in the signal charge accumulation portion 2012 is determined. Here, the accumulation operation is terminated.

Then, charge supply from the power supply line 2030 to the output signal line 2020 is stopped, and the potential 2120 of the output signal line is determined. Here, the read operation is terminated.

Next, an operation mode according to FIG. 14B is described.

The potential 2113 of the charge accumulation control signal line 2013 is set to a high level at the time 2130. Next, when the potential 2114 of the reset signal line 2014 is set to a high level at the time 2131, the potential 2112 of the signal charge accumulation portion 2012 and the potential of the cathode of the photodiode 2001 are initialized to the potential 2120 of the output signal line 2020 connected to the other of the source and the drain of the reset transistor 2004. These steps are referred to as the reset operation.

When the potential 2113 of the charge accumulation control signal line 2013 is set to a low level at time 2134 and then the potential 2114 of the reset signal line 2014 is set to a low level at time 2135, the reset operation is terminated; accordingly, reverse current corresponding to the amount of light flows to the photodiode to which the reverse bias is applied, whereby the potential of the cathode of the photodiode 2001 varies.

When the potential 2113 of the charge accumulation control signal line 2013 is set to a high level again at the time 2132, current flows by a potential difference between the potential 2112 of the signal charge accumulation portion 2012 and the potential of the cathode of the photodiode 2001, and the potential 2112 of the signal charge accumulation portion 2012 varies.

The steps after that are the same as those of the operation mode according to FIG. 14A.

Next, a pixel circuit structure of three transistors, which is different from that described above, is illustrated in FIG. 15. The pixel circuit includes a photodiode 2201, an amplifying transistor 2202, a charge accumulation control transistor 2203, and a selection transistor 2205. An anode of the photodiode 2201 is connected to a reset signal line 2216.

A gate of the charge accumulation control transistor 2203 is connected to a charge accumulation control signal line 2213, one of a source and a drain of the charge accumulation control transistor 2203 is connected to a cathode of the photodiode 2201, and the other of the source and the drain of the charge accumulation control transistor 2203 is connected to a signal charge accumulation portion 2212.

A gate of the amplifying transistor 2202 is connected to the signal charge accumulation portion 2212, one of a source and a drain of the amplifying transistor 2202 is connected to a power supply line 2230, and the other of the source and the drain of the amplifying transistor 2202 is connected to one of a source and a drain of the selection transistor 2205.

A gate of the selection transistor 2205 is connected to a selection signal line 2215, and the other of the source and the drain of the selection transistor 2205 is connected to an output signal line 2220. Here, a charge holding capacitor may be connected to between the signal charge accumulation portion 2212 and a reference signal line.

Figure 15:
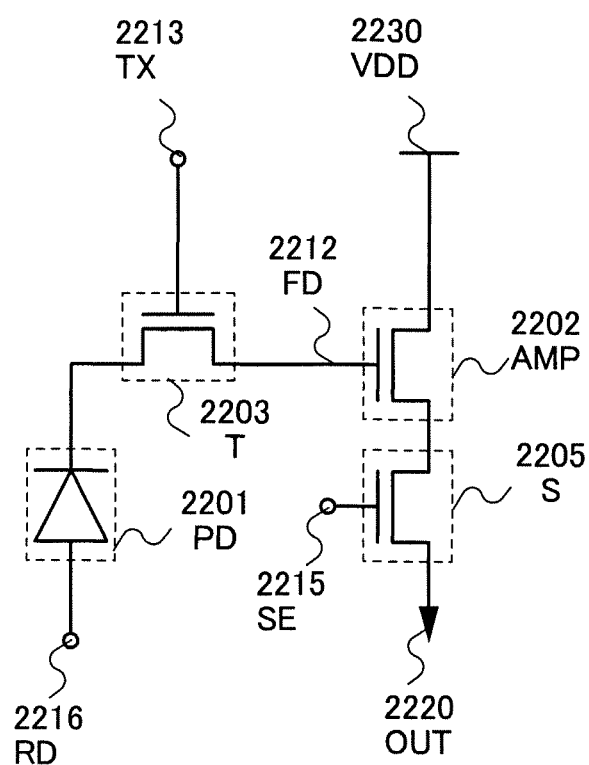
FIG. 15 illustrates a circuit structure of a pixel of a photosensor.

Next, functions of the elements forming the pixel circuit of FIG. 15 are described. The photodiode 2201 generates current in accordance with the amount of light incident on the pixel. The amplifying transistor 2202 outputs a signal which corresponds to the potential of the signal charge accumulation portion 2212. The charge accumulation control transistor 2203 controls charge accumulation in the signal charge accumulation portion 2212 performed by the photodiode 2201. The selection transistor 2205 controls the selection of the pixel in reading. The signal charge accumulation portion 2212 is a charge holding node, and holds charge which varies depending on the amount of light received by the photodiode 2201.

The charge accumulation control signal line 2213 is a signal line which controls the charge accumulation control transistor 2203. The reset signal line 2216 is a signal line which supplies a reset potential to the signal charge accumulation portion 2212. The output signal line 2220 is a signal line to serve as an output destination of a signal generated by the amplifying transistor 2202. The selection signal line 2215 is a signal line which controls the selection transistor 2205. The power supply line 2230 is a signal line which supplies power supply voltage.

Figure 16A:
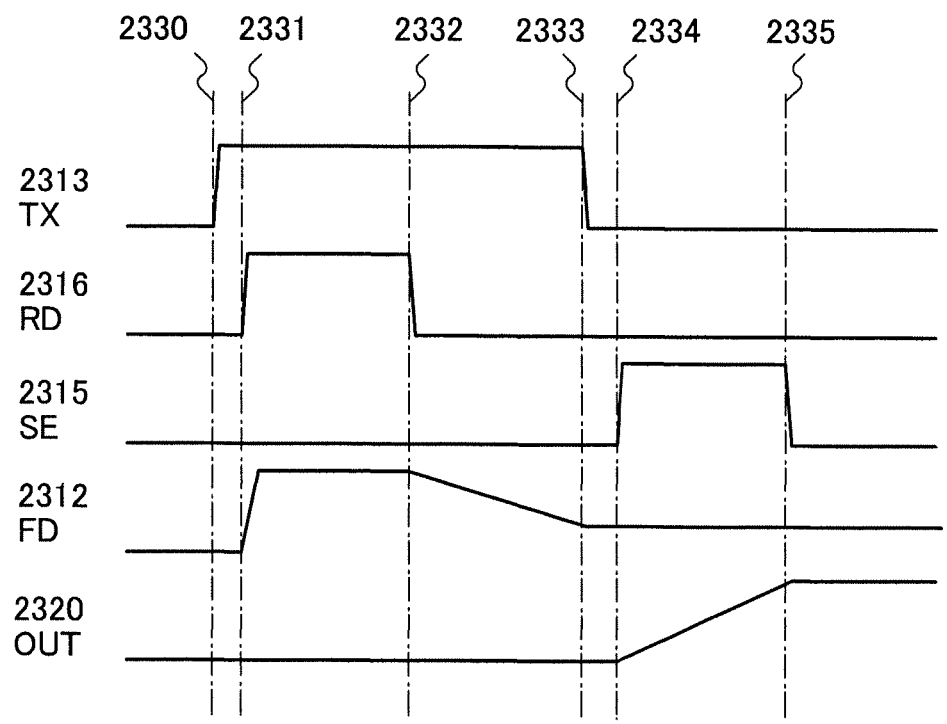
FIGS. 16A and 16B are timing charts each illustrating operation of a pixel circuit of a photosensor.
Figure 16B:
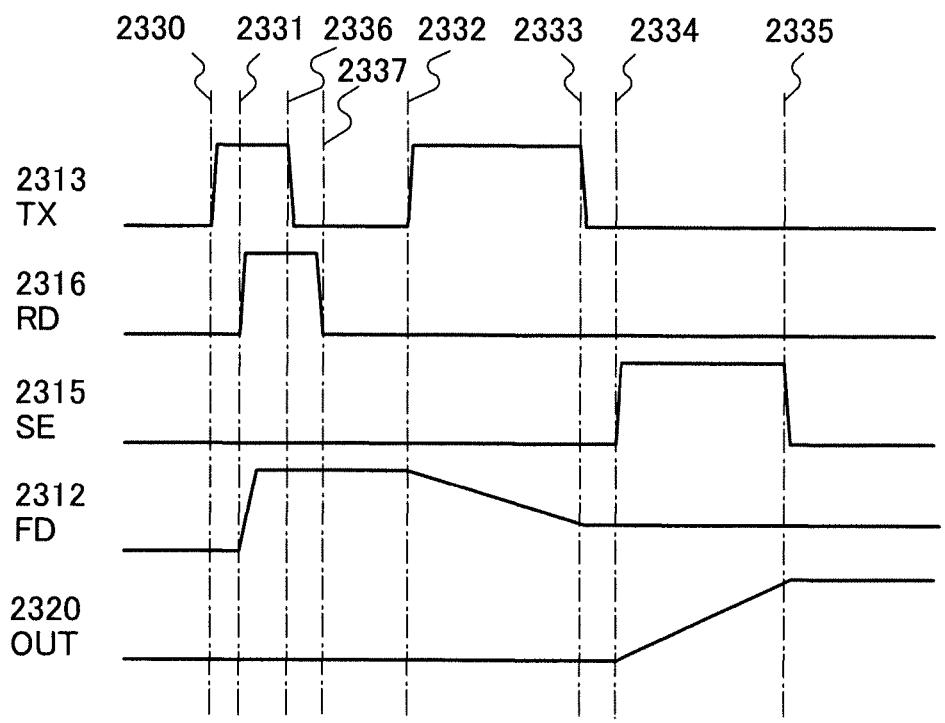

Next, the operations of the pixel circuits of FIG. 15 are described using timing charts shown in FIGS. 16A and 16B.

For simple description in FIGS. 16A and 16B, a potential 2313 of the charge accumulation control signal line 2213, a potential 2316 of the reset signal line 2216, and a potential 2315 of the selection signal line 2215 are signals which vary between two levels. Note that because each potential is an analog signal, the potential can, in practice, have various levels in accordance with situations without limitation on two levels.

First, an operation mode according to FIG. 16A is described.

The potential 2313 of the charge accumulation control signal line 2213 is set to a high level at time 2330. Next, when the potential 2316 of the reset signal line 2216 is set to a high level at time 2331, a potential 2312 of the signal charge accumulation portion 2212 and the potential of the cathode of the photodiode 2201 are initialized to the potential which is lower than the potential 2316 of the reset signal line 2216 by forward voltage of the photodiode 2201. These steps are referred to as the reset operation.

When the potential 2316 of the reset signal line 2216 is set to a low level at time 2332, the potential 2312 of the signal charge accumulation portion 2212 is kept at a high level, whereby a reverse bias is applied to the photodiode 2201. At this stage, the accumulation operation starts.

Then, because the reverse current corresponding to the amount of light flows to the photodiode 2201, the amount of charge accumulated in the signal charge accumulation portion 2212 varies in accordance with the amount of light.

When the potential 2313 of the charge accumulation control signal line 2213 is set to a low level at time 2333, transfer of charge from the signal charge accumulation portion 2212 to the photodiode 2201 stops, whereby the amount of charge accumulated in the signal charge accumulation portion 2212 is determined. Here, the accumulation operation is terminated.

When the potential 2315 of the selection signal line 2215 is set to a high level at time 2334, charge is supplied from the power supply line 2230 to the output signal line 2220 in accordance with the potential 2312 of the signal charge accumulation portion 2212. At this stage, the read operation starts.

When the potential 2315 of the selection signal line 2215 is set to a low level at time 2335, charge supply from the power supply line 2230 to the output signal line 2220 is stopped, and a potential 2320 of the output signal line is determined 2220. Here, the read operation is terminated.

Next, an operation mode according to FIG. 16B is described.

The potential 2313 of the charge accumulation control signal line 2213 is set to a high level at the time 2330. Next, when the potential 2316 of the reset signal line 2216 is set to a high level at the time 2331, the potential 2312 of the signal charge accumulation portion 2212 and the potential of the cathode of the photodiode 2201 are initialized to the reset potential which is lower than the potential 2316 of the reset signal line by forward voltage of the photodiode 2201. These steps are referred to as the reset operation.

When the potential 2313 of the charge accumulation control signal line 2213 is set to a low level at time 2336 and then the potential 2316 of the reset signal line 2216 is set to a low level at time 2337, the reset operation is terminated; accordingly, reverse current corresponding to the amount of light flows to the photodiode to which the reverse bias is applied, whereby the potential of the cathode of the photodiode 2201 varies.

When the potential 2313 of the charge accumulation control signal line 2213 is set to a high level again at the time 2332, current flows by a potential difference between the potential 2312 of the signal charge accumulation portion 2212 and the potential of the cathode of the photodiode 2201, whereby the potential 2312 of the signal charge accumulation portion varies 2212.

The steps after that are the same as those of the operation mode according to FIG. 16A.

Figure 17:
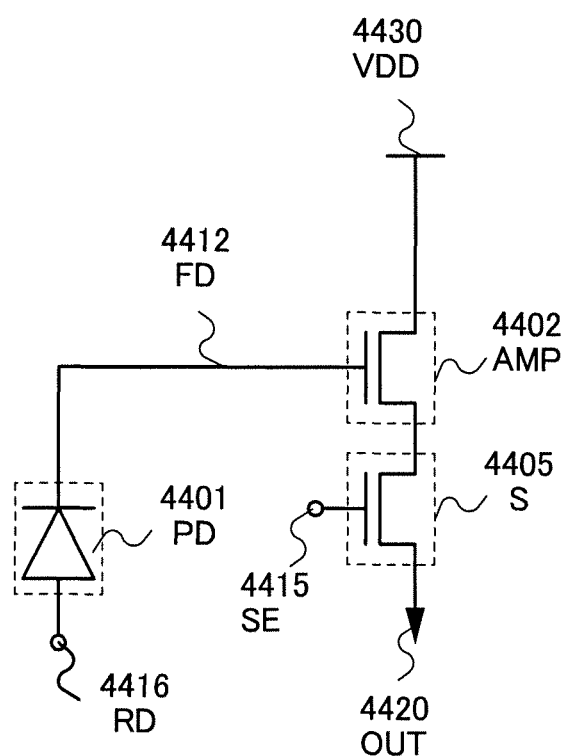
FIG. 17 illustrates a circuit structure of a pixel of a photosensor.

Next, a pixel circuit structure of a two transistor type illustrated in FIG. 17 is described.

The pixel circuit includes a photodiode 4401, an amplifying transistor 4402, and a selection transistor 4405.

A gate of the amplifying transistor 4402 is connected to a signal charge accumulation portion 4412, one of a source and a drain of the amplifying transistor 4402 is connected to a power supply line 4430, and the other of the source and the drain of the amplifying transistor 4402 is connected to one of a source and a drain of the selection transistor 4405.

A gate of the selection transistor 4405 is connected to a selection signal line 4415, and the other of the source and the drain of the selection transistor 4405 is connected to an output signal line 4420.

A cathode of the photodiode 4401 is connected to the signal charge accumulation portion 4412, and an anode of the photodiode 4401 is connected to a reset signal line 4416. Here, a charge holding capacitor is connected between the signal charge accumulation portion 4412 and a reference signal line.

Next, a function of an element included in the pixel circuit in FIG. 17 is described. The photodiode 4401 generates current in accordance with the amount of light incident on the pixel. The amplifying transistor 4402 outputs a signal which corresponds to the potential of the signal charge accumulation portion 4412. The selection transistor 4405 controls the selection of the pixel in reading. The signal charge accumulation portion 4412 is a charge holding node, and holds charge which varies depending on the amount of light received by the photodiode 4401.

The reset signal line 4416 is a signal line which supplies a reset potential to the signal charge accumulation portion 4412. The output signal line 4420 is a signal line to serve as an output destination of a signal generated by the amplifying transistor 4402. The selection signal line 4415 is a signal line which controls the selection transistor 4405. The power supply line 4430 is a signal line which supplies power supply voltage.

Figure 18:
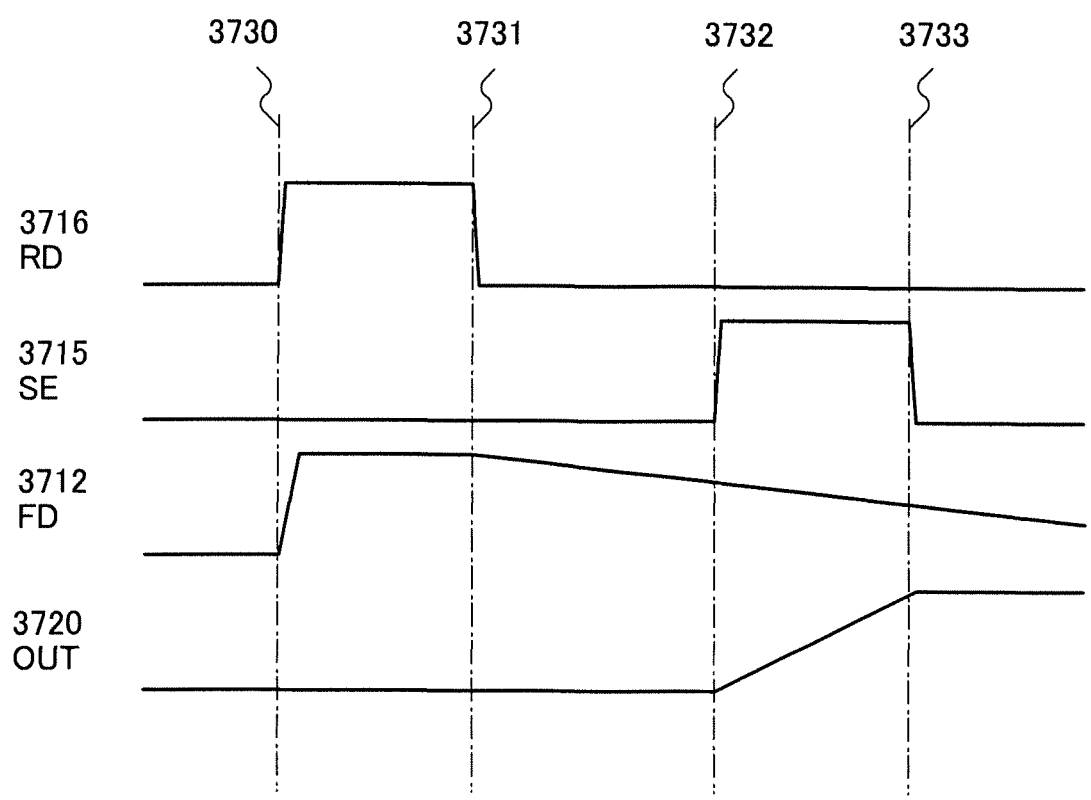
FIG. 18 is a timing chart illustrating operation of a pixel circuit of a photosensor.

Next, the operations of the pixel circuits of FIG. 17 are described using timing charts shown in FIG. 18.

For simple description in FIG. 18, a potential 3716 of the reset signal line 4416 and a potential 3715 of the selection signal line 4415 are signals which vary between two levels. Note that because each potential is an analog signal, the potential can, in practice, have various levels in accordance with situations without limitation on two levels.

When the potential 3716 of the reset signal line 4416 is set to a high level at time 3730, a potential 3712 of the signal charge accumulation portion 4412 is initialized to the reset potential which is lower than the potential 3716 of the reset signal line 4416 by forward voltage of the photodiode 4401. These steps are referred to as the reset operation.

When the potential 3716 of a reset signal line 4416 is set to a low level at time 3731, the potential 3712 of the signal charge accumulation portion 4412 holds the reset potential, whereby a reverse bias is applied to the photodiode 2001. At this stage, the accumulation operation starts.

Then, because the reverse current corresponding to the amount of light flows to the photodiode 4401, the amount of charge accumulated in the signal charge accumulation portion 4412 varies in accordance with the amount of light.

When the potential 3715 of the selection signal line 4415 is set to a high level at time 3732, charge is supplied from the power supply line 4430 to the output signal line 4420 in accordance with the potential 3712 of the signal charge accumulation portion 4412. At this stage, the read operation starts.

When the potential 3715 of the selection signal line 4415 is set to a low level at time 3733, transfer of charge from the signal charge accumulation portion 4412 to the photodiode 4401 stops, whereby the amount of charge accumulated in the signal charge accumulation portion 4412 is determined. Here, the accumulation operation is terminated.

Then, charge supply from the power supply line 4430 to the output signal line 4420 is stopped, and a potential 3720 of the output signal line is determined. Here, the read operation is terminated.

Figure 19:
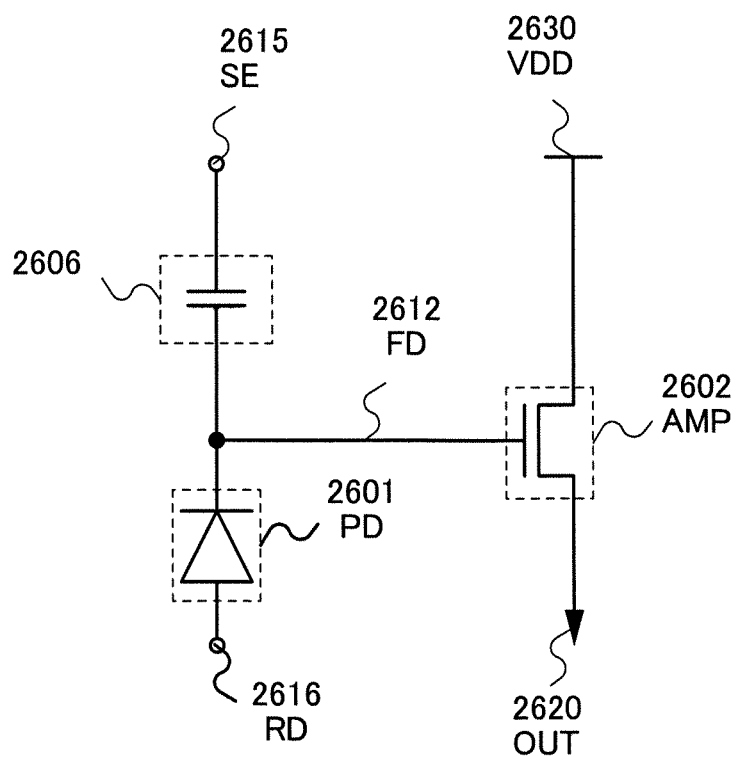
FIG. 19 illustrates a circuit structure of a pixel of a photosensor.

Next, a pixel circuit structure of one transistor is illustrated in FIG. 19. The pixel circuit includes a photodiode 2601, an amplifying transistor 2602, and a capacitor 2606.

A gate of the amplifying transistor 2602 is connected to a signal charge accumulation portion 2612, one of a source and a drain of the amplifying transistor 2602 is connected to the power supply line 2630, and the other of the source and drain the amplifying transistor 2602 is connected to an output signal line 2620.

A cathode of the photodiode 2601 is connected to the signal charge accumulation portion 2612, and an anode of the photodiode 2601 is connected to a reset signal line 2616. One of terminals of the capacitor 2606 is connected to the signal charge accumulation portion 2612 and the other is connected to a selection signal line 2615. Here, a charge holding capacitor is connected between the signal charge accumulation portion 2612 and a reference signal line.

Next, functions of the elements forming the pixel circuit of FIG. 19 are described. The photodiode 2601 generates current in accordance with the amount of light incident on the pixel. The amplifying transistor 2602 outputs a signal which corresponds to the potential of the signal charge accumulation portion 2612. The signal charge accumulation portion 2612 is a charge holding node, and holds charge which varies depending on the amount of light received by the photodiode 2601. Note that the selection signal line 2615 controls the potential of the signal charge accumulation portion 2612 with the use of capacitive coupling.

The reset signal line 2616 is a signal line which supplies a reset potential to the signal charge accumulation portion 2612. The output signal line 2620 is a signal line to serve as an output destination of a signal generated by the amplifying transistor 2602. The selection signal line 2615 is a signal line which controls the capacitor 2606. The power supply line 2630 is a signal line which supplies power supply voltage.

Figure 20:
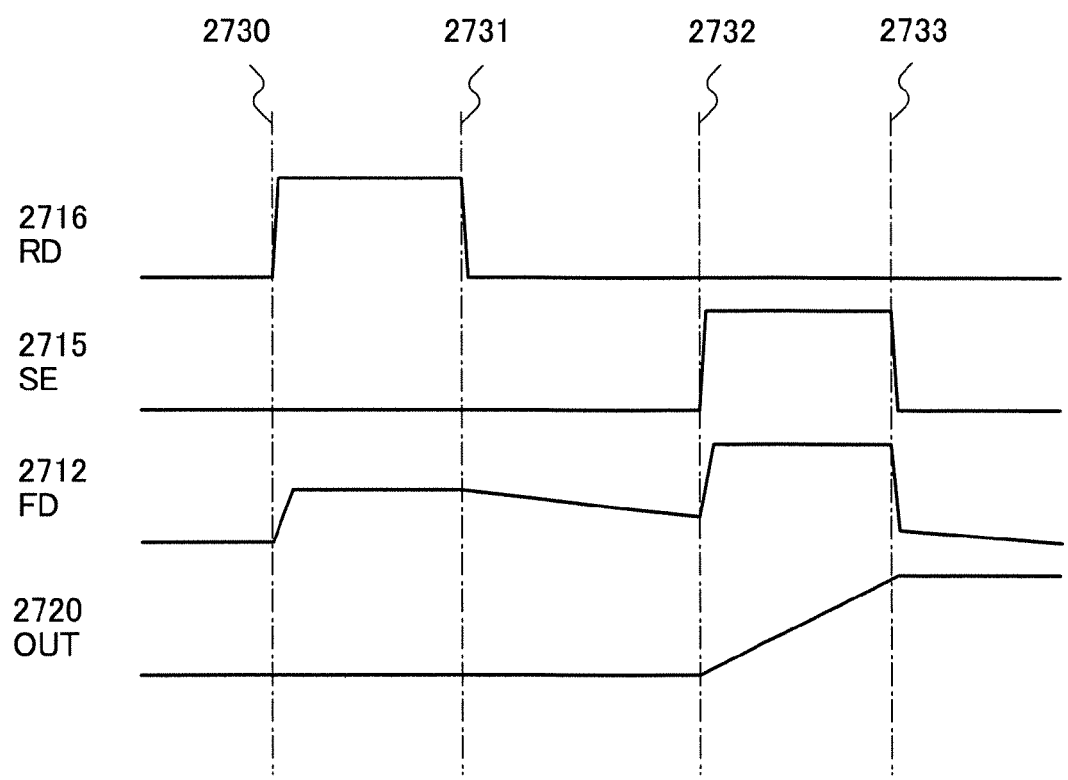
FIG. 20 is a timing chart illustrating operation of a pixel circuit of a photosensor.

Next, the operations of the pixel circuits of FIG. 19 are described using timing charts shown in FIG. 20.

For simple description in FIG. 20, a potential 2716 of the reset signal line 2616 and the potential 2715 of a selection signal line 2615 are signals which vary between two levels. Note that because each potential is an analog signal, the potential can, in practice, have various levels in accordance with situations without limitation on two levels.

When the potential 2716 of the reset signal line 2616 is set to a high level at time 2730, a potential 2712 of the signal charge accumulation portion 2612 is initialized to the reset potential which is lower than the potential 2716 of the reset signal line 2616 by forward voltage of the photodiode 2601. These steps are referred to as the reset operation.

Next, when the potential 2716 of a reset signal line 2616 is set to a low level at time 2731, the potential 2712 of the signal charge accumulation portion 2612 holds the reset potential, whereby a reverse bias is applied to the photodiode 2601. At this stage, the accumulation operation starts.

Then, because the reverse current corresponding to the amount of light flows to the photodiode 2601, the amount of charge accumulated in the signal charge accumulation portion 2612 varies in accordance with the amount of light.

The potential 2715 of the selection signal line 2615 is set to a high level ar time 2732, so that the potential 2712 of the signal charge accumulation portion 2612 becomes higher due to capacitive coupling; accordingly, the amplifying transistor 2602 is turned on. Further, charge is supplied from the power supply line 2630 to the output signal line 2620 in accordance with the potential 2712 of the signal charge accumulation portion 2612. At this stage, the read operation starts.

When the potential 2715 of the selection signal line 2615 is set to a low level at time 2733, the potential 2712 of the signal charge accumulation portion 2612 is decreased by capacitive coupling and transfer of charge from the signal charge accumulation portion 2612 to the photodiode 2601 stops, whereby the amount of charge accumulated in the signal charge accumulation portion 2612 is determined. Here, the accumulation operation is terminated.

Then, charge supply from the power supply line 2630 to the output signal line 2620 is stopped, and a potential 2720 of the output signal line 2620 is determined. Here, the read operation is terminated.

Note that the pixel circuit structures in FIG. 17 and FIG. 19 have preferably a structure of shielding incident light to the photodiode because charge of the signal charge accumulation portion flows out through the photodiode with the above structures.

This embodiment can be implemented in combination with any of the other embodiments or the examples, as appropriate.

Embodiment 4

In this embodiment, a liquid crystal display device which is an example of the display device disclosed in this specification is described.

Figure 21:
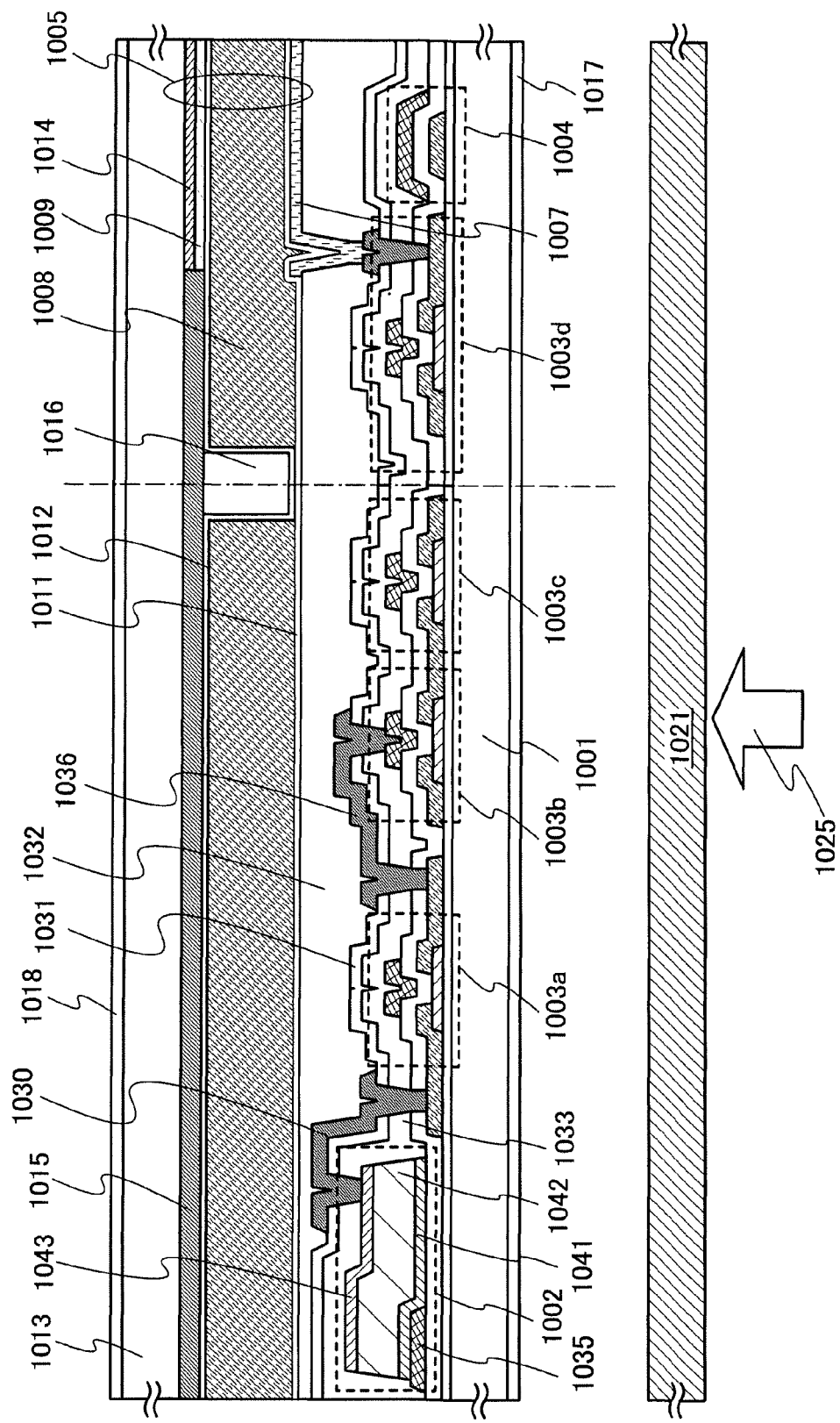
FIG. 21 is a cross sectional view of a display device where a display region is provided with both a display element and a photosensor.

FIG. 21 illustrates an example of a cross-sectional view of a liquid crystal display device. In the liquid crystal display device in this embodiment, a photodiode 1002, a transistor 1003*a*, a transistor 1003*b*, a transistor 1003*c*, a transistor 1003*d*, a storage capacitor 1004, and a liquid crystal element 1005 are provided over a substrate 1001 having an insulating surface. Note that a photosensor and a display element are partly shown on the left side and the right side, respectively, of a short dash line across the liquid crystal display device in FIG. 21, and these structures are equivalent to the structure of the photosensor portion 106 in FIG. 2 described in Embodiment 1. Note that a transistor corresponding to a reset transistor is not shown.

Although a top-gate structure is illustrated as a typical example of the structure of each of the transistor 1003*a*, the transistor 1003*b*, the transistor 1003*c*, and the transistor 1003*d*, without limitation thereto, another structure such as a self-aligned structure or a bottom-gate structure may be applied.

The transistor 1003*a* provided in the photosensor corresponds to a charge accumulation control transistor. A wiring 1030 is connected to one of a source electrode and a drain electrode of the transistor 1003*a* and is electrically connected to a cathode of the photodiode 1002. Further, the other of the source electrode and the drain electrode of the transistor 1003*a* is connected to a wiring 1036 and a gate electrode of the transistor 1003*b*. Note that the wiring 1030 and the wiring 1036 may be formed over an insulating film 1033 instead of a protective insulating film 1031.

The transistor 1003*b* corresponds to the amplifying transistor. One of a source electrode and a drain electrode of the transistor 1003*b* is connected to a power supply line which is not shown. The other of the source electrode and the drain electrode of the transistor 1003*b* is connected to one of a source electrode and a drain electrode of the transistor 1003*c*.

The transistor 1003*c* corresponds to the selection transistor. The other of the source electrode and the drain electrode of the transistor 1003*c* is connected to an output signal line which is not shown.

Here, one of a source electrode and a drain electrode of a transistor corresponding to the reset transistor which is not shown is connected to the wiring 1036, and the other of the source electrode and the drain electrode of the transistor is connected to the power supply line which is not shown.

The photodiode 1002 has a stacked-layer type of PIN junction which includes a p-type semiconductor layer 1041 containing an impurity imparting p-type conductivity, an i-type semiconductor layer 1042 having characteristics of an intrinsic semiconductor, and an n-type semiconductor layer 1043 containing an impurity imparting n-type conductivity.

As a typical example, a photodiode in which amorphous silicon is used for the i-type semiconductor layer 1042 can be given. Although amorphous silicon can be used also for the p-type semiconductor layer 1041 and the n-type semiconductor layer 1043 in this case, it is preferable to use microcrystalline silicon having high electrical conductivity. The photodiode in which amorphous silicon is used for the i-type semiconductor layer 1042 has photosensitivity in a visible light region and can prevent malfunction due to an infrared ray.

Here, the p-type semiconductor layer 1041 which is an anode of the photodiode 1002 is electrically connected to a signal wiring 1035, and the n-type semiconductor layer 1043 which is a cathode of the photodiode 1002 is electrically connected to one of the source electrode and the drain electrode of the transistor 1003*a* as described above. Note that the signal wiring 1035 corresponds to a reference signal line.

Note that although not illustrated, a light-transmitting conductive layer may be provided on the light incident side of the p-type semiconductor layer 1041. In addition, a conductive layer may be provided on an interface side with the insulating film 1033 of the n-type semiconductor layer 1043. For example, the wiring 1030 may be extended to cover the n-type semiconductor layer 1043. With such a conductive layer provided, loss of electric charge due to the resistance of the p-type semiconductor layer 1041 or the n-type semiconductor layer 1043 can be reduced.

Note that although the case where the photodiode 1002 is a PIN diode is illustrated in this embodiment, the photodiode 1002 may be a PN diode. In this case, high-quality crystalline silicon is preferably used for the p-type semiconductor layer and the n-type semiconductor layer.

Figure 22:
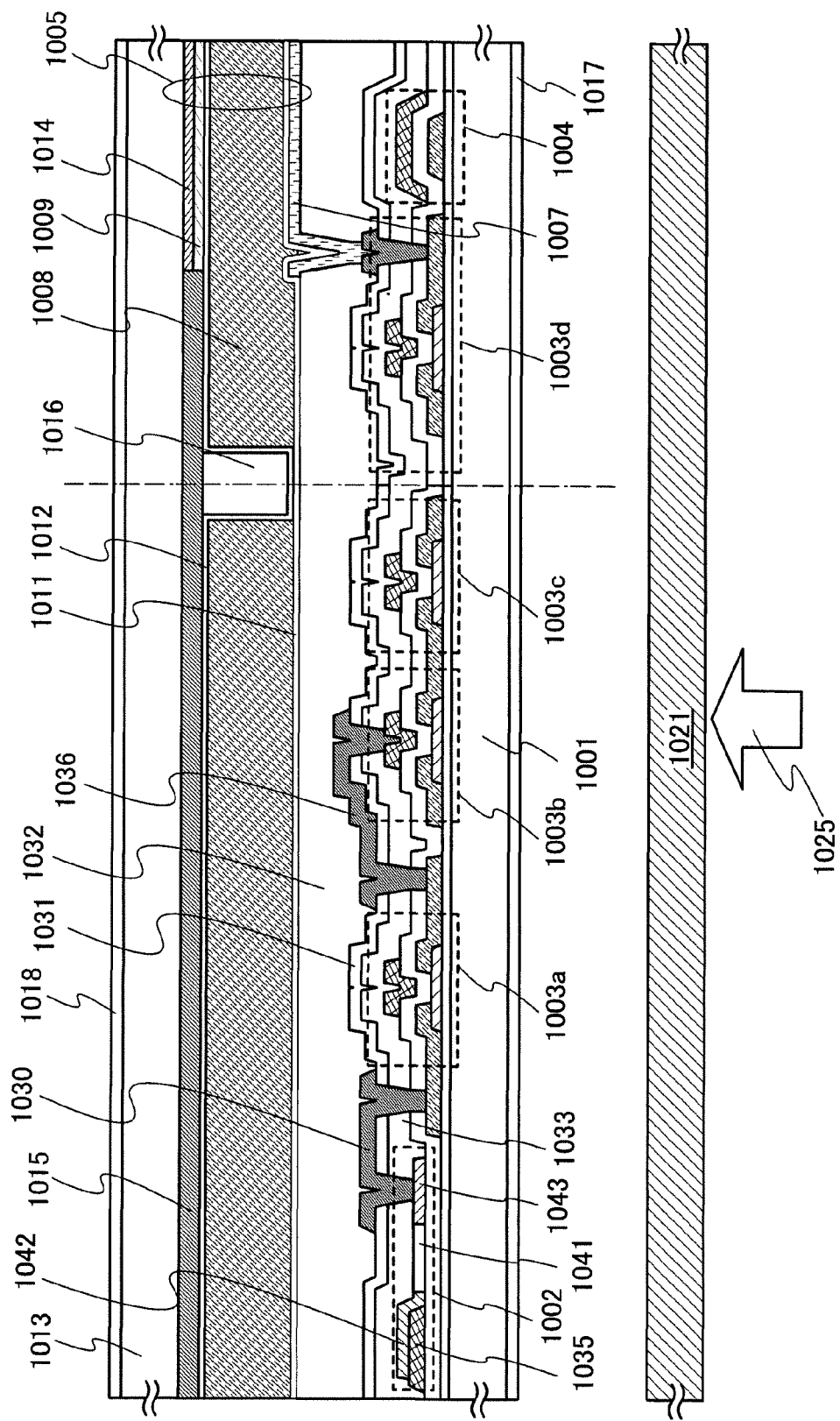
FIG. 22 is a cross sectional view of a display device where a display region is provided with both a display element and a photosensor.

The photodiode may have a structure of a horizontal junction as illustrated in FIG. 22. In a PIN horizontal junction photodiode, a p-type semiconductor layer 1041, an i-type semiconductor layer 1042, and an n-type semiconductor layer 1043 can be provided as follows: an i-type semiconductor layer is formed, and an impurity imparting p-type conductivity and an impurity imparting n-type conductivity are added into parts of the i-type semiconductor layer.

The transistor 1003*d* is provided in the display element to drive the liquid crystal element. One of a source electrode and a drain electrode of the transistor 1003*d* is electrically connected to a pixel electrode 1007, and although not illustrated, the other of the source electrode and the drain electrode thereof is electrically connected to the signal wiring.

The storage capacitor 1004 can be formed in the step of forming the transistor 1003*a*, the transistor 1003*b*, the transistor 1003*c*, and the transistor 1003*d*. A capacitor wiring and a capacitor electrode are formed in respective steps of forming a gate electrode of the transistor and for forming a source or drain electrode thereof, and an insulating film which is a capacity of the storage capacitor 1004 is formed in a step of forming a gate insulating film of the transistor. The storage capacitor 1004 is electrically connected to one of the source electrode and the drain electrode of the transistor 1003d, in parallel to the liquid crystal element 1005.

The liquid crystal element 1005 includes the pixel electrode 1007, liquid crystals 1008, and a counter electrode 1009. The pixel electrode 1007 is formed over a planarization insulating film 1032 and is electrically connected to one of the source electrode and the drain electrode of the transistor 1003d and the storage capacitor 1004. Further, the counter electrode 1009 is provided for a counter substrate 1013, and the liquid crystals 1008 are provided between the pixel electrode 1007 and the counter electrode 1009.

A cell gap between the pixel electrode 1007 and the counter electrode 1009 can be controlled by using a spacer 1016. Although the cell gap is controlled using the spacer 1016 which is selectively formed by photolithography and has a columnar shape in FIG. 21 and FIG. 22, the cell gap can alternatively be controlled by sphere spacers dispersed between the pixel electrode 1007 and the counter electrode 1009. The position of the spacer 1016 in FIG. 21 and FIG. 22 is an example, and the position of the spacer can be determined as appropriate by a practitioner.

Further, the liquid crystals 1008, between the substrate 1001 and the counter substrate 1013, are surrounded by a sealing material. The liquid crystals 1008 may be injected by a dispenser method (droplet method) or a dipping method (pumping method).

The pixel electrode 1007 can be formed using a light-transmitting conductive material such as indium tin oxide (ITO), indium tin oxide containing silicon oxide, organic indium, organic tin, zinc oxide, indium zinc oxide (IZO) containing zinc oxide, zinc oxide containing gallium, tin oxide, indium oxide containing tungsten oxide, indium zinc oxide containing tungsten oxide, indium oxide containing titanium oxide, indium tin oxide containing titanium oxide, or the like.

In addition, because the transparent liquid crystal element 1005 is given as an example in this embodiment, the counter electrode 1009 can also be formed using the above light-transmitting conductive material as in the case of the pixel electrode 1007.

An alignment film 1011 is provided between the pixel electrode 1007 and the liquid crystals 1008 and an alignment film 1012 is provided between the counter electrode 1009 and the liquid crystals 1008. The alignment film 1011 and the alignment film 1012 can be formed using an organic resin such as polyimide or polyvinyl alcohol. Alignment treatment such as rubbing is performed on their surfaces in order to align liquid crystal molecules in certain direction. Rubbing can be performed by rolling a roller wrapped with cloth of nylon or the like while pressure is applied on the alignment film so that the surface of the alignment film is rubbed in certain direction. By using an inorganic material such as silicon oxide, the alignment film 1011 and the alignment film 1012 each having an alignment property can be directly formed by evaporation method without performing alignment treatment.

Further, a color filter 1014 capable of transmitting light with a particular wavelength is provided for the counter substrate 1013 so as to overlap with the liquid crystal element 1005. The color filter 1014 can be selectively formed as follows: an organic resin such as an acrylic-based resin in which pigment is dispersed is applied on the counter substrate 1013 and is subjected to photolithography. Alternatively, the color filter 1014 can be selectively formed as follows: a polyimide-based resin in which pigment is dispersed is applied on the counter substrate 1013 and is subjected to etching. Still alternatively, the color filter 1014 can be selectively formed by a droplet discharge method such as an ink-jet method. Note that, the structure in which the color filter 1014 is not provided is also possible.

Further, a shielding film 1015 capable of shielding light is provided for the counter substrate 1013 so as to overlap with the photodiode 1002. The shielding film 1015 can prevent irradiation on the photodiode 1002 directly with light of the backlight passing through the counter substrate 1013. In addition, the shielding film 1015 can prevent disclination due to disorder of alignment of the liquid crystals 1008 among pixels from being observed. The shielding film 1015 can be formed using an organic resin containing black colorant such as carbon black or titanium lower oxide. Alternatively, the shielding film 1015 can be formed using a film of chromium.

Further, a polarizing plate 1017 is provided on the side of the substrate 1001, which is opposite to the side over which the pixel electrode 1007 is provided, and a polarizing plate 1018 is provided on the side of the counter substrate 1013, which is opposite to the side over which the counter electrode 1009 is provided.

The liquid crystal element can be a TN (twisted nematic) type, a VA (vertical alignment) type, an OCB (optically compensated birefringence) type, an IPS (in-plane switching) type, or the like. Although the liquid crystal element 1005 in which the liquid crystals 1008 are provided between the pixel electrode 1007 and the counter electrode 1009 is described as an example in this embodiment, the display device according to one embodiment of the present invention is not limited to this structure. A liquid crystal element in which a pair of electrodes is provided on the substrate 1001 side such as an IPS type liquid crystal element may also be employed.

External light to be detected by the photodiode 1002 enters the substrate 1001 in a direction indicated by an arrow 1025 to reach the photodiode 1002. For example, when an object 1021 to be detected exists, the object 1021 to be detected blocks external light, so that incidence of the external light into the photodiode 1002 is prevented. The display device can function as a touch panel by detecting light which thus enters the photodiode and a shadow thereof.

Further, an object to be detected may be in close contact with the substrate 1001 and external light passing through the object to be detected may be detected by the photodiode, so that the display device can function as a contact-type image sensor.

This embodiment can be implemented in combination with any of the other embodiments or the examples, as appropriate.

Embodiment 5

In this embodiment, a liquid crystal display device which is an example of the display device according to one embodiment of the present invention, which is different from Embodiment 4, is described.

Embodiment 3 can be referred to except for the description made below. For example, transistors, a photodiode, a liquid crystal element, and the like can be formed using the same materials as those in Embodiment 3.

Figure 23:
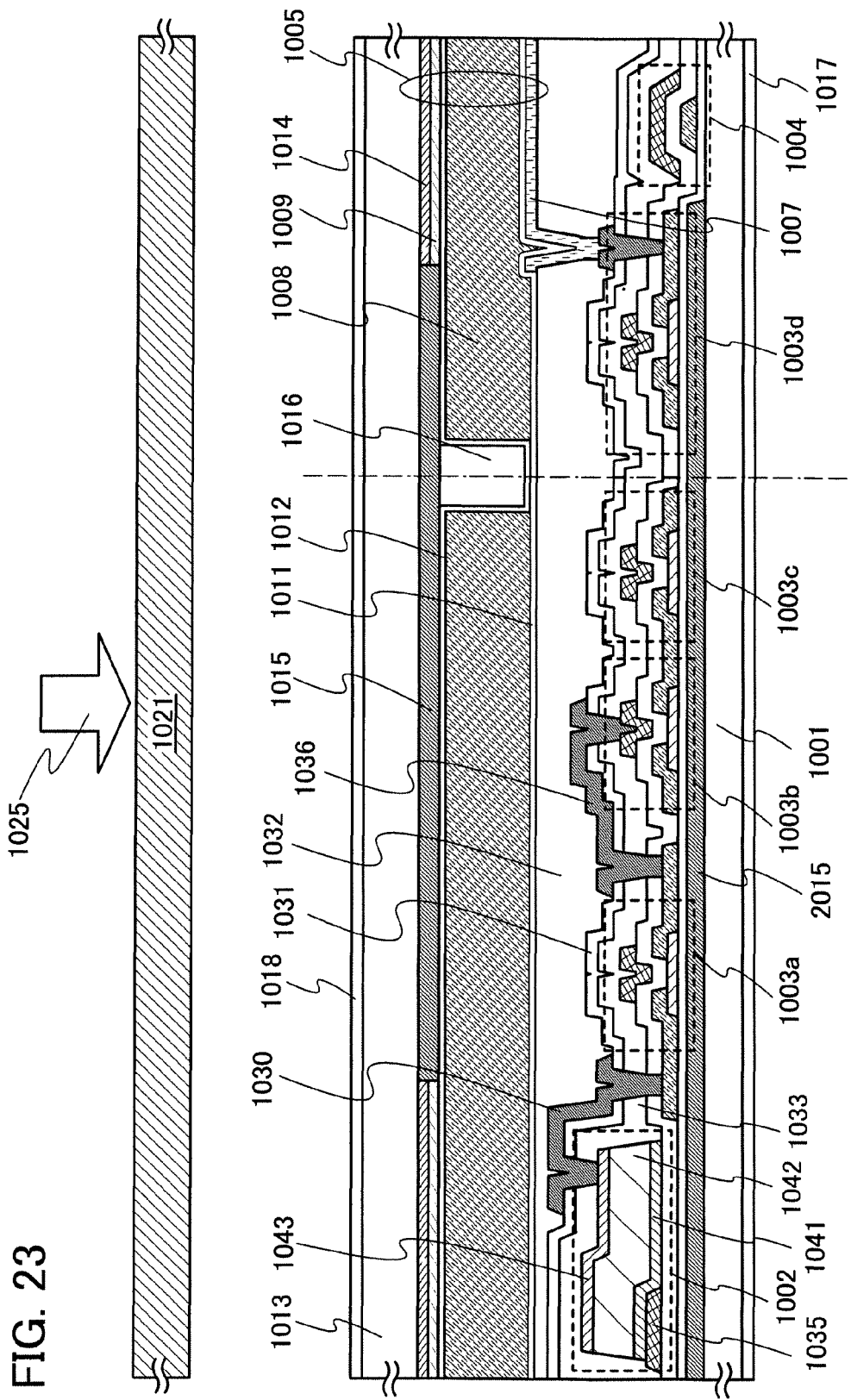
FIG. 23 is a cross sectional view of a display device where a display region is provided with both a display element and a photosensor.

FIG. 23 is an example of a cross-sectional view of the display device which is different from Embodiment 4. Unlike Embodiment 4 in which light enters from the substrate side on which the photosensor is manufactured, light enters a photosensor from the counter substrate side, that is, through a liquid crystal layer in this embodiment.

Therefore, it is necessary to form an opening in a region of the shielding film 1015 provided for the counter substrate 1013, which overlaps with the photodiode 1002. The color filter 1014 may be formed in the opening as illustrated in a drawing. A plurality of photosensors provided with color filters with colors R (red), G (green), and B (blue) may be provided in a pixel to form a color sensor, and a color image sensor function can be provided.

Although light enters from the p-type semiconductor layer 1041 side of the photodiode 1002 in Embodiment 4, light enters from the n-type semiconductor layer 1043 side in this embodiment in the case where a photodiode has a structure similar to that in Embodiment 4. The reason why light is made to enter from the p-type semiconductor layer side is that holes whose diffusion length is short can be effectively taken out, that is, a larger amount of current can be taken out from the photodiode, and light may enter from the n-type semiconductor layer side as long as a design current value is satisfied.

In this embodiment, the p-type semiconductor layer 1041 and the n-type semiconductor layer 1043 may be counterchanged each other in the photodiode 1002, so that light can easily enter from the p-type semiconductor layer side. Note that in that case, the operation method is different from that described in Embodiment 4 because the gate electrode is connected to the transistor 1003a on the p-type semiconductor layer (anode) side. Embodiment 1 can be referred to for each operation method.

Figure 24:
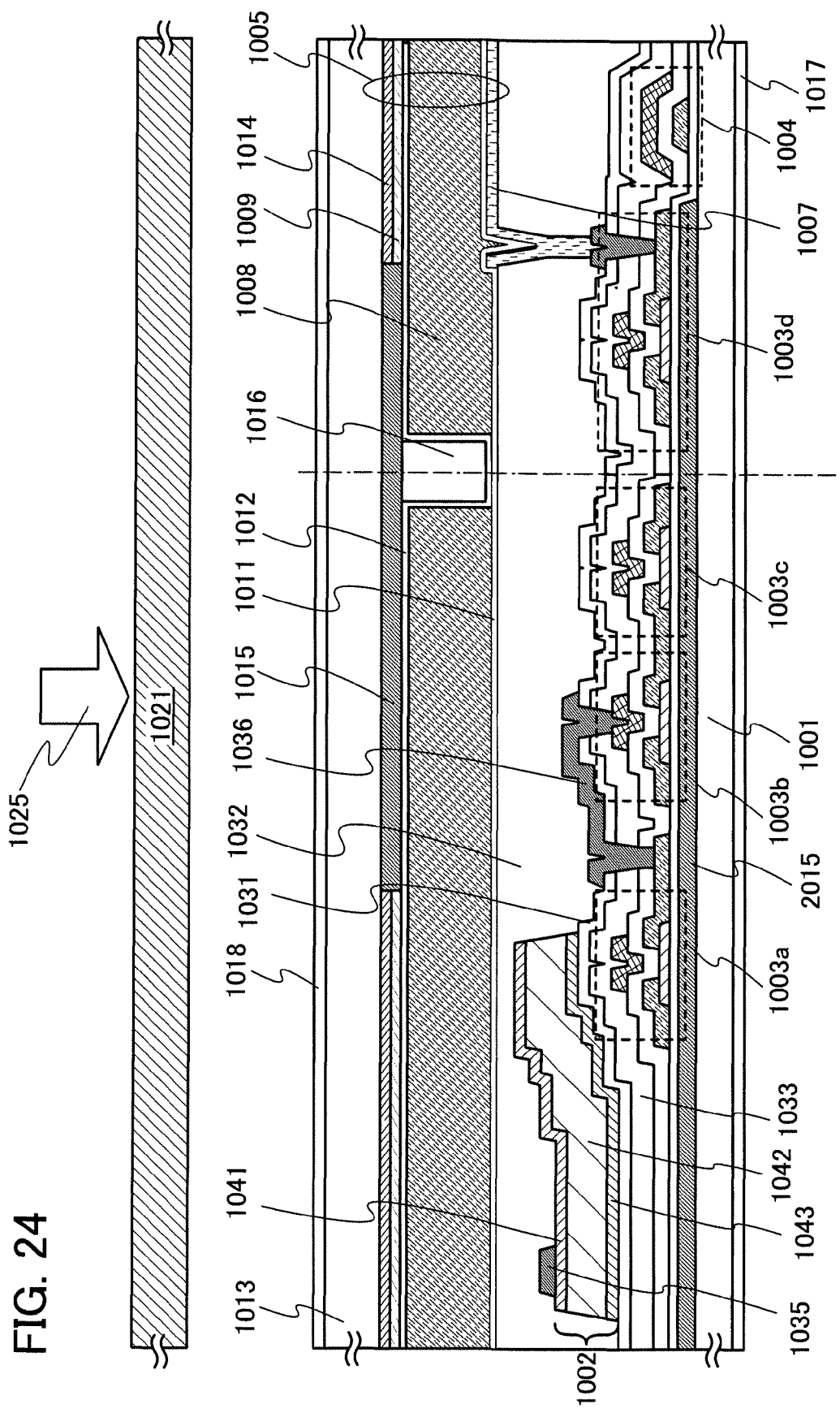
FIG. 24 is a cross sectional view of a display device where a display region is provided with both a display element and a photosensor.

The photodiode 1002 may be formed to overlap with and over the transistor 1003a as illustrated in FIG. 24. It is needless to say that the photodiode 1002 may overlap with another transistor. In this case, one of the source electrode and the drain electrode of the transistor 1003a can be easily connected to the n-type semiconductor layer 1043 of the photodiode 1002, and light can enter from the p-type semiconductor layer 1041 side. Further, the photodiode can be formed to have a large area, thereby improving the light-receiving sensitivity.

Although not illustrated, a light-transmitting conductive layer may be provided on the light incidence side of the photodiode 1002 in any of FIG. 23 and FIG. 24. A conductive layer may be provided on the side opposite to the light incidence side of the photodiode 1002. With such a conductive layer provided, loss of electric charge due to the resistance of the p-type semiconductor layer 1041 or the n-type semiconductor layer 1043 can be reduced.

In this embodiment, a shielding film 2015 is provided on the side opposite to the light-receiving side of the photodiode 1002. The shielding film 2015 prevents the photodiode 1002 from being directly irradiated with light from the backlight that passes through the substrate 1001 and enters the display panel, so that high-accuracy imaging can be performed. The shielding film 2015 can be formed using an organic resin containing black colorant such as carbon black or titanium lower oxide. Alternatively, the shielding film 2015 can be formed using a film of chromium.

External light to be detected by the photodiode 1002 enters the counter substrate 1013 in a direction indicated by an arrow 1025 to reach the photodiode 1002. For example, when the object 1021 to be detected exists, the object 1021 to be detected blocks external light, so that incidence of the external light into the photodiode 1002 is blocked out. The display device can function as a touch panel by detecting the intensity of light which thus enters the photodiode.

Further, an object to be detected may be in close contact with the counter substrate 1013 and external light passing through the object may be detected by the photodiode, so that the display device can function as a contact-type image sensor can be provided.

This embodiment can be implemented in combination with any of the other embodiments or the examples, as appropriate.

Embodiment 6

In this embodiment, an example of a writing board (such as a blackboard and a whiteboard) using a display panel including a photosensor is described.

Figure 25:
FIG. 25 illustrates a specific example of an electronic device.

For example, the display panel including a photosensor is provided at the position of a display panel 9696 in FIG. 25.

The display panel 9696 has a photosensor and a display element.

Here, it is possible to write freely with a marker pen or the like on the surface of the display panel 9696.

Note that it is easy to erase letters if the letters are written with a marker pen or the like without a fixer.

In addition, it is preferable that the surface of the display panel 9696 be adequately smooth in order that the ink of the marker pen may be easily removed.

For example, the surface of the display panel 9696 has sufficient smoothness when a glass substrate or the like is used for the surface of the display panel 9696.

Alternatively, a transparent synthetic resin sheet or the like may be attached to the surface of the display panel 9696.

Acrylic resin, for example, is preferably used as the synthetic resin. In this case, the surface of the sheet of synthetic resin is preferably smooth.

In addition, because the display panel 9696 includes a display element, the display panel 9696 can display a particular image and at the same time, it is possible to write down letters or the like on the surface of the display panel 9696 with a marker pen.

Further, the display panel 9696 includes the photosensor, so that letters written with the marker pen can be read and printed out if the display panel 9696 is connected to a printer or the like.

Further, because the display panel 9696 includes the photosensor and the display element, by writing text, drawing figures, or the like on the surface of the display panel 9696 with an image displayed, a trail of the marker pen read by the photosensor and the image can be synthesized and displayed on the display panel 9696.

Note that sensing with resistive touch sensors, capacitive touch sensors, or the like can be performed only at the same time as writing with a marker pen or the like.

On the other hand, sensing with a photosensor is superior in that sensing can be performed anytime after something is written with a marker or the like, even if time passes.

This embodiment can be implemented in combination with any of the other embodiments or the examples, as appropriate.

Example 1

Figure 26:
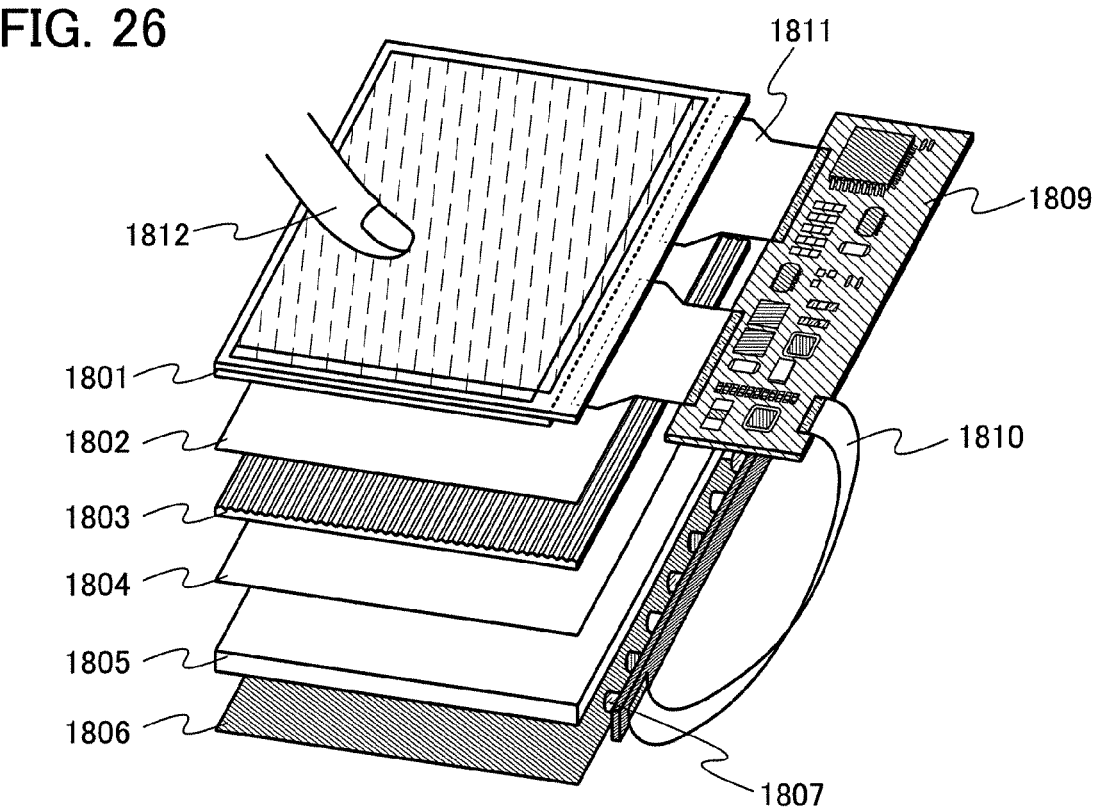
FIG. 26 illustrates a structure of a display device.

In this example, positions of a panel and a light source are described. FIG. 26 is an example of a perspective view illustrating the structure of a display panel. A display panel illustrated in FIG. 26 includes a panel 1801 in which a pixel including a liquid crystal element, a photodiode, a thin film transistor, and the like is formed between a pair of substrates; a first diffuser plate 1802; a prism sheet 1803; a second diffuser plate 1804; a light guide plate 1805; a reflector plate 1806; a plurality of light sources 1807 of a backlight; and a circuit board 1809.

The panel 1801, the first diffuser plate 1802, the prism sheet 1803, the second diffuser plate 1804, the light guide plate 1805, and the reflector plate 1806 are stacked sequentially. The light sources 1807 of the backlight are provided at an end portion of the light guide plate 1805. Light from the light sources 1807 of the backlight diffused into the light guide plate 1805 is uniformly delivered from the counter substrate side on the panel 1801 with the help of the first diffuser plate 1802, the prism sheet 1803, and the second diffuser plate 1804.

Although the first diffuser plate 1802 and the second diffuser plate 1804 are used in this example, the number of diffuser plates is not limited thereto. The number of diffuser plates may be one, or may be three or more. The diffuser plate may be in any place as long as the diffuser plate is provided between the light guide plate 1805 and the panel 1801. Therefore, the diffuser plate may be provided only on the side closer to the panel 1801 than the prism sheet 1803, or may be provided only on the side closer to the light guide plate 1805 than the prism sheet 1803.

Further, the shape of the cross section of the prism sheet 1803, which is illustrated in FIG. 26, is not only serrate, and the shape may be a shape with which light from the light guide plate 1805 can be gathered to the panel 1801 side.

The circuit board 1809 is provided with a circuit for generating or processing various signals inputted to the panel 1801, a circuit for processing various signals outputted from the panel 1801, and the like. In FIG. 26, the circuit board 1809 and the panel 1801 are connected to each other via a flexible printed circuit (FPC) 1811. Note that the above circuit may be connected to the panel 1801 by a chip on glass (COG) method, or part of the above circuit may be connected to the FPC 1811 by a chip on film (COF) method.

FIG. 26 illustrates an example in which the circuit board 1809 is provided with a control circuit for controlling driving of the light source 1807 of the backlight, and the control circuit and the light source 1807 of the backlight are connected to each other via an FPC 1810. However, the control circuit may be formed over the panel 1801, and in that case, the panel 1801 and the light sources 1807 of the backlight are made to be connected to each other via an FPC or the like.

Note that although FIG. 26 illustrates an edge-light type light source in which the light sources 1807 of the backlight are provided on the edge of the panel 1801, the display panel according to one embodiment of the present invention may be a direct-below type display panel in which the light sources 1807 of the backlight are provided directly below the panel 1801.

For example, when a finger 1812 which is an object to be detected gets close to the panel 1801 from the upper side, part of light that passes through the panel 1801 reflects off the finger 1812 and enters the panel 1801 again. Color image data of the finger 1812 which is the object to be detected can be obtained by sequentially lighting the light sources 1807 of the backlight that correspond to individual colors and obtaining image data of every color. Further, the position of the finger 1812 which is the object to be detected can be recognized from the image data, with which data of a display image can be combined to provide a function as a touch panel.

This embodiment can be implemented in combination with any of the other embodiments or the examples, as appropriate.

Example 2

A display device according to one embodiment of the present invention is characterized by obtaining image data. Therefore, an electronic device using the display device according to one embodiment of the present invention can be more sophisticated by adding the display device as a component.

For example, the display device can be used for display devices, laptop computers, or image reproducing devices provided with recording media (typically, devices which reproduce the content of recording media such as DVDs (digital versatile discs), and have displays for displaying the reproduced images). In addition to the above examples, as an electronic device which can include the display device according to one embodiment of the present invention, mobile phones, portable game machines, portable information terminals, e-book readers, video cameras, digital still cameras, goggle-type displays (head mounted displays), navigation systems, audio reproducing devices (e.g., car audio components and digital audio players), copiers, facsimiles, printers, multifunction printers, automated teller machines (ATM), vending machines, and the like can be given. Specific examples of such an electronic device are illustrated in FIGS. 27A to 27D.

Figure 27A:
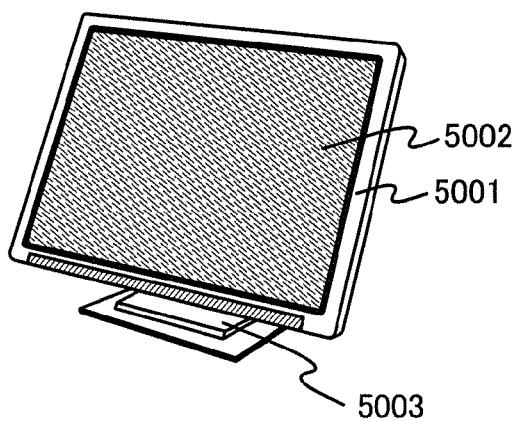
FIGS. 27A to 27D each illustrate a specific example of an electronic device.

FIG. 27A illustrates a display device including a housing 5001, a display portion 5002, a supporting base 5003, and the like. The display device according to one embodiment of the present invention can be used for the display portion 5002. The use of the display device according to one embodiment of the present invention for the display portion 5002 can provide a display device capable of obtaining image data with high perception performance and capable of being equipped with higher-functional applications. Note that the display device includes all display devices for displaying information, such as display devices for personal computers, display devices for receiving TV broadcasts, and display devices for displaying advertisements.

Figure 27B:
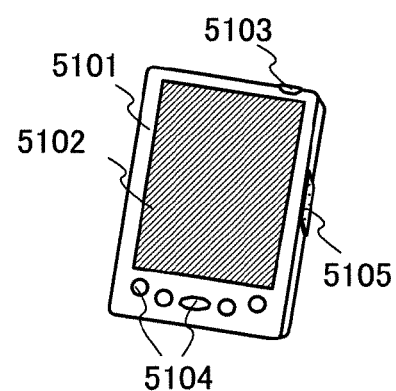

FIG. 27B illustrates a portable information terminal including a housing 5101, a display portion 5102, a switch 5103, operation keys 5104, an infrared rays port 5105, and the like. The display device according to one embodiment of the present invention can be used for the display portion 5102. The use of the display device according to one embodiment of the present invention for the display portion 5102 can provide a portable information terminal capable of obtaining image data with high perception performance and being equipped with higher-functional applications.

Figure 27C:
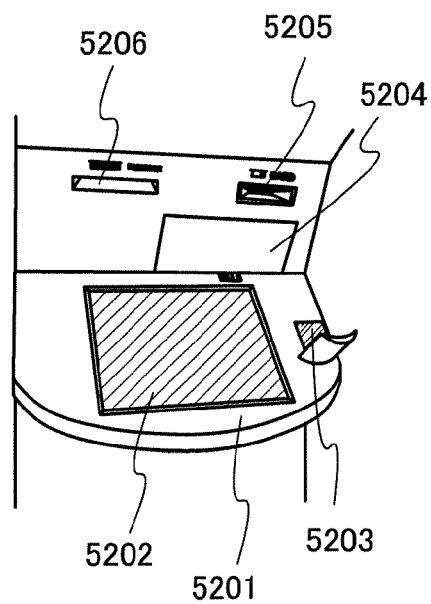

FIG. 27C illustrates an automated teller machine including a housing 5201, a display portion 5202, a coin slot 5203, a bill slot 5204, a card slot 5205, a bankbook slot 5206, and the like. The display device according to one embodiment of the present invention can be used for the display portion 5202. The use of the display device according to one embodiment of the present invention for the display portion 5202 can provide an automated teller machine capable of obtaining image data with high perception performance and being more sophisticated. The automated teller machine using the display device according to one embodiment of the present invention can read information of living body such as a finger print, a face, a handprint, a palm print, a pattern of a hand vein, an iris, and the like which are used for biometrics with higher accuracy. Therefore, a false nonmatch rate which is caused by false recognition of a person to be identified as a different person and a false acceptance rate which is caused by false recognition of a different person as a person to be identified can be suppressed.

Figure 27D:
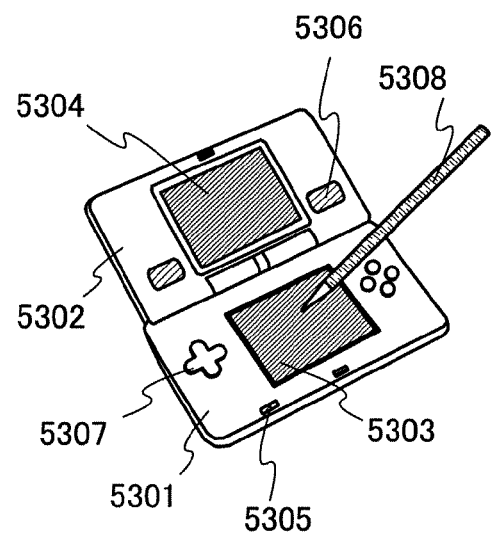

FIG. 27D illustrates a portable game machine including a housing 5301, a housing 5302, a display portion 5303, a display portion 5304, a microphone 5305, speakers 5306, an operation key 5307, a stylus 5308, and the like. The display device according to one embodiment of the present invention can be used for the display portion 5303 or the display portion 5304. The use of the display device according to one embodiment of the present invention for the display portion 5303 or the display portion 5304 can provide a portable game machine capable of obtaining image data with high perception performance and being equipped with higher-functional applications. Note that although the portable game machine illustrated in FIG. 27D includes the two display portions 5303 and 5304, the number of display portions included in the portable game machine is not limited to two.

This embodiment can be implemented in combination with any of other embodiments and other example, as appropriate.

This application is based on Japanese Patent Application serial no. 2010-055878 filed with Japan Patent Office on Mar. 12, 2010, the entire contents of which are hereby incorporated by reference.

The invention claimed is:

1. A method for driving a display device wherein the display device comprises:
a first photosensor portion comprising:
  a first photodiode;
  a first transistor comprising a gate, a first terminal, and a second terminal, wherein the first terminal of the first transistor is electrically connected to the first photodiode;
  a second transistor comprising a gate, a first terminal, and a second terminal, wherein the gate of the second transistor is electrically connected to the second terminal of the first transistor; and
  a third transistor comprising a gate, a first terminal, and a second terminal, wherein the first terminal of the third transistor is electrically connected to the first terminal of the second transistor;
a second photosensor portion comprising:
  a second photodiode;
  a fourth transistor comprising a gate, a first terminal, and a second terminal, wherein the first terminal of the fourth transistor is electrically connected to the second photodiode;
  a fifth transistor comprising a gate, a first terminal, and a second terminal, wherein the gate of the fifth transistor is electrically connected to the second terminal of the fourth transistor; and
  a sixth transistor comprising a gate, a first terminal, and a second terminal, wherein the first terminal of the sixth transistor is electrically connected to the first terminal of the fifth transistor; and
a backlight;
the method comprising the steps of:
turning off the backlight;
turning on the first transistor and the fourth transistor simultaneously;
after the turning on the first transistor and the fourth transistor, turning off the first transistor and the fourth transistor simultaneously;
after turning off the first transistor and the fourth transistor, turning on the backlight;
after turning on the backlight, turning on the third transistor; and
after turning on the third transistor, turning on the sixth transistor,
wherein each of the first transistor and the fourth transistor comprises an oxide semiconductor,
wherein the second photosensor portion is provided in a row different from the first photosensor portion.

2. The method for driving a display device according to claim 1, wherein the oxide semiconductor comprises indium, gallium, and zinc.

3. The method for driving a display device according to claim 1,
wherein the gate of the first transistor is electrically connected to a first wiring, and
wherein the gate of the fourth transistor is electrically connected to a second wiring being different from the first wiring.

4. A method for driving a display device wherein the display device comprises:
a backlight; and
a pixel array comprising:
  a plurality of display element portions;
  a plurality of photosensor portions, each of the plurality of photosensor portions comprising:
    a photodiode;
    a first transistor comprising a gate, a first terminal, and a second terminal, wherein the first terminal of the first transistor is electrically connected to the photodiode;
    a second transistor comprising a gate, a first terminal, and a second terminal, wherein the gate of the second transistor is electrically connected to the second terminal of the first terminal; and
    a third transistor comprising a gate, a first terminal, and a second terminal, wherein the first terminal of the third transistor is electrically connected to the first terminal of the second transistor;
the method comprising the steps of:
turning off the backlight;
after turning off the backlight, applying a first potential to the gate of the first transistor in all of the plurality of photosensor portions simultaneously and changing a second potential to a third potential in a node between the second terminal of the first transistor and the gate of the second transistor with irradiating the photodiode with light,
after applying the first potential to the gate of the first transistor, turning on the backlight;
after turning on the backlight, applying a fourth potential to the gate of the third transistor in all of the plurality of photosensor portions sequentially row by row to turn on the third transistor,
wherein the light is irradiated from out of the display device,
wherein each of the plurality of photosensor portions is provided in a row different from one another, and
wherein the first transistor comprises an oxide semiconductor.

5. The method for driving a display device according to claim 4, wherein the oxide semiconductor comprises indium, gallium, and zinc.

6. The method according to claim 4, wherein none of the first transistor in all of the plurality of photosensor portions is on during the third transistor being on.

7. The method according to claim 1, wherein a node between the second terminal of the first transistor and the gate of the second transistor holds charge in accordance with an amount of light received by the first photodiode.

8. The method according to claim 4, wherein the node between the gate of the second transistor and the second terminal of the first transistor holds charge in accordance with an amount of light received by the photodiode.

9. A method for driving a display device wherein the display device comprises:
- a pixel array comprising a plurality of pixels provided in a matrix, each of the plurality of pixels comprising:
  - a display element portion; and
  - a photosensor portion comprising a signal charge accumulation portion; and
- a backlight;

the method comprising the steps of:
turning off the backlight;
after turning off the backlight, accumulating charge to the signal charge accumulation portion of the photosensor portion simultaneously in all of the plurality of pixels;
after accumulating the charge, turning on the backlight; and
after turning on the backlight, outputting a signal corresponding to a potential of the signal charge accumulation portion of the photosensor portion by sequentially selecting the plurality of pixels row by row.

10. The method according to claim 9, wherein operation from turning off the backlight to outputting the signal is performed within one frame period.

* * * * *